(12) United States Patent
Jenkins

(10) Patent No.: US 7,709,593 B2
(45) Date of Patent: May 4, 2010

(54) MULTIPLE FEEDS OF CATALYST METALS TO A POLYESTER PRODUCTION PROCESS

(75) Inventor: Jason Christopher Jenkins, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 236 days.

(21) Appl. No.: 11/714,942

(22) Filed: Mar. 7, 2007

(65) Prior Publication Data

US 2008/0027206 A1    Jan. 31, 2008

Related U.S. Application Data

(60) Provisional application No. 60/834,081, filed on Jul. 28, 2006.

(51) Int. Cl.
*C08G 63/00* (2006.01)

(52) U.S. Cl. .................. 528/275; 528/279; 528/281; 528/283; 528/351; 528/357; 528/358; 422/129; 422/131; 422/134; 422/188; 422/312

(58) Field of Classification Search ............... 528/272, 528/277, 279, 283, 285; 425/130, 131.1; 422/129, 131, 134, 188, 312

See application file for complete search history.

(56) References Cited

U.S. PATENT DOCUMENTS

| | | | |
|---|---|---|---|
| 2,711,402 A | 6/1955 | Fletcher et al. | |
| 2,720,506 A | 10/1955 | Caldwell et al. | |
| 2,808,390 A | 10/1957 | Caldwell et al. | |
| 2,965,613 A | 12/1960 | Milone et al. | |
| 3,264,255 A | 8/1966 | Taylor | |
| 3,420,913 A | 1/1969 | Railsback | |
| 3,528,945 A | 9/1970 | Stewart et al. | |
| 3,528,946 A | 9/1970 | Stewart et al. | |
| 3,533,973 A | 10/1970 | Stewart et al. | |
| 3,733,309 A | 5/1973 | Wyeth et al. | |
| 3,852,262 A | 12/1974 | Vit et al. | |
| 3,959,390 A | 5/1976 | Vanlerberghe | |
| 4,087,482 A | 5/1978 | Shaffer | |
| 4,093,593 A | 6/1978 | Go | |
| 4,107,149 A | 8/1978 | Bier et al. | |
| 4,124,566 A | 11/1978 | Saiki et al. | |
| 4,133,794 A | 1/1979 | Lamb | |

(Continued)

FOREIGN PATENT DOCUMENTS

CN    1392174    1/2003

(Continued)

OTHER PUBLICATIONS

Office Action mail date Jun. 4, 2008 received in co-pending U.S. Appl. No. 11/511,719.

(Continued)

*Primary Examiner*—Ling-Siu Choi
*Assistant Examiner*—Frances Tischler
(74) *Attorney, Agent, or Firm*—Brett L Nelson; Bernard J. Graves, Jr.

(57) ABSTRACT

Processes for feeding catalyst systems to a melt phase process for the manufacture of polyester polymers, and more particularly, to split catalyst solution feeds to the melt phase process to provide the target amount and ratio of catalyst metals.

38 Claims, 2 Drawing Sheets

U.S. PATENT DOCUMENTS

| | | |
|---|---|---|
| 4,159,301 A | 6/1979 | Buser et al. |
| 4,161,571 A | 7/1979 | Yasui et al. |
| 4,169,006 A | 9/1979 | Matsubara et al. |
| 4,185,043 A | 1/1980 | Shaffer |
| 4,207,134 A | 6/1980 | Valyi |
| 4,228,549 A | 10/1980 | Rispoli |
| 4,230,595 A | 10/1980 | Yamaji et al. |
| 4,250,078 A | 2/1981 | McFarlane et al. |
| 4,330,661 A | 5/1982 | Go |
| 4,343,922 A | 8/1982 | Shaffer |
| 4,355,154 A | 10/1982 | Saam et al. |
| 4,357,461 A | 11/1982 | Go et al. |
| 4,408,004 A | 10/1983 | Pengilly |
| 4,420,581 A | 12/1983 | McFarlane et al. |
| 4,424,337 A | 1/1984 | Smith et al. |
| 4,433,135 A | 2/1984 | Worley et al. |
| 4,440,924 A | 4/1984 | Kuze et al. |
| 4,447,595 A | 5/1984 | Smith et al. |
| 4,476,272 A | 10/1984 | Pengilly |
| 4,481,314 A | 11/1984 | Rule |
| 4,499,288 A | 2/1985 | Harris |
| 4,520,078 A | 5/1985 | Rabinowitz et al. |
| 4,535,118 A | 8/1985 | Pengilly |
| 4,551,368 A | 11/1985 | Smith et al. |
| 4,604,303 A | 8/1986 | Takakura et al. |
| 4,617,374 A | 10/1986 | Pruett et al. |
| 4,686,274 A | 8/1987 | Harris et al. |
| 4,702,963 A | 10/1987 | Phillips et al. |
| 4,704,417 A | 11/1987 | Bonin et al. |
| 4,705,844 A | 11/1987 | Espenschied et al. |
| 4,740,377 A | 4/1988 | Dawes et al. |
| 4,764,323 A | 8/1988 | Al Ghatta |
| 4,806,696 A | 2/1989 | Job |
| 4,831,115 A | 5/1989 | Golba, Jr. et al. |
| 4,845,186 A | 7/1989 | Chujo et al. |
| 4,876,230 A | 10/1989 | Job |
| 4,906,693 A | 3/1990 | Craun et al. |
| 5,041,405 A | 8/1991 | Lunsford et al. |
| 5,049,647 A | 9/1991 | Al-Ghatta |
| 5,090,134 A | 2/1992 | Russemeyer et al. |
| 5,104,965 A | 4/1992 | Jenkins et al. |
| 5,114,570 A | 5/1992 | Nelson et al. |
| 5,124,301 A | 6/1992 | Wyness et al. |
| 5,220,140 A | 6/1993 | Ball et al. |
| 5,250,333 A | 10/1993 | McNeely et al. |
| 5,254,288 A | 10/1993 | Verheijen et al. |
| 5,258,233 A | 11/1993 | Mills et al. |
| 5,266,413 A | 11/1993 | Mills et al. |
| 5,296,587 A | 3/1994 | Sumner, Jr. et al. |
| 5,300,746 A | 4/1994 | Walters et al. |
| 5,310,977 A | 5/1994 | Stenkamp et al. |
| 5,340,884 A | 8/1994 | Mills et al. |
| 5,367,070 A | 11/1994 | Nath et al. |
| 5,372,864 A | 12/1994 | Weaver et al. |
| 5,382,157 A | 1/1995 | Denis et al. |
| 5,384,377 A | 1/1995 | Weaver et al. |
| 5,393,871 A | 2/1995 | Yau et al. |
| 5,403,807 A | 4/1995 | Narula |
| 5,409,983 A | 4/1995 | Jones et al. |
| 5,410,984 A | 5/1995 | Pikus et al. |
| 5,419,936 A | 5/1995 | Tindale |
| 5,496,887 A | 3/1996 | Braune |
| 5,514,462 A | 5/1996 | Endo et al. |
| 5,519,112 A | 5/1996 | Harazoe et al. |
| 5,529,744 A | 6/1996 | Tindale |
| 5,573,820 A | 11/1996 | Harazoe et al. |
| 5,593,740 A | 1/1997 | Strumban et al. |
| 5,610,231 A | 3/1997 | Braune |
| 5,646,208 A | 7/1997 | Cattron et al. |
| 5,656,221 A | 8/1997 | Schumann et al. |
| 5,656,716 A | 8/1997 | Schmidt et al. |
| 5,674,801 A | 10/1997 | George |
| 5,688,874 A | 11/1997 | Hoffman |
| 5,718,860 A | 2/1998 | Lee et al. |
| 5,733,969 A | 3/1998 | Thiele |
| 5,774,571 A | 6/1998 | Marshall |
| 5,830,544 A | 11/1998 | Kerscher et al. |
| 5,830,981 A | 11/1998 | Koreishi et al. |
| 5,837,786 A | 11/1998 | Miyoshi et al. |
| 5,851,668 A | 12/1998 | Sandor et al. |
| 5,898,058 A | 4/1999 | Nichols et al. |
| 5,906,882 A | 5/1999 | Valente et al. |
| 5,925,710 A | 7/1999 | Wu et al. |
| 5,940,022 A | 8/1999 | Takatsu |
| 5,962,608 A | 10/1999 | Ryang et al. |
| 5,976,450 A | 11/1999 | Mreijen |
| 5,998,004 A | 12/1999 | Nishino et al. |
| 6,020,419 A | 2/2000 | Bock et al. |
| 6,020,421 A | 2/2000 | Fukushima et al. |
| 6,022,920 A | 2/2000 | Maxwell et al. |
| 6,031,128 A | 2/2000 | Roh et al. |
| 6,034,202 A | 3/2000 | Aharoni et al. |
| 6,036,905 A | 3/2000 | Park et al. |
| 6,042,773 A | 3/2000 | Teramoto et al. |
| 6,063,827 A | 5/2000 | Sacripante et al. |
| 6,066,714 A | 5/2000 | Putzig et al. |
| 6,150,454 A | 11/2000 | Wu et al. |
| 6,156,867 A | 12/2000 | Aoyama et al. |
| 6,165,601 A | 12/2000 | Noda et al. |
| 6,166,170 A | 12/2000 | Putzig |
| 6,197,851 B1 | 3/2001 | Maxwell et al. |
| 6,200,659 B1 | 3/2001 | Fujimori et al. |
| 6,214,915 B1 | 4/2001 | Avakian et al. |
| 6,261,656 B1 | 7/2001 | Semersky |
| 6,274,212 B1 | 8/2001 | Rule et al. |
| 6,274,852 B1 | 8/2001 | Blok et al. |
| 6,281,278 B1 | 8/2001 | Takase et al. |
| 6,300,399 B1 | 10/2001 | Gallucci et al. |
| 6,313,200 B1 | 11/2001 | Finder |
| 6,316,584 B1 | 11/2001 | Seidel et al. |
| 6,323,271 B1 | 11/2001 | Caldwell et al. |
| 6,358,578 B1 | 3/2002 | Otto et al. |
| 6,365,659 B1 | 4/2002 | Aoyama et al. |
| 6,372,929 B1 | 4/2002 | Ridland et al. |
| 6,417,320 B1 | 7/2002 | Otto et al. |
| 6,427,826 B1 | 8/2002 | Li et al. |
| 6,428,882 B1 | 8/2002 | Peiffer et al. |
| 6,451,959 B1 | 9/2002 | Ohmatsuzawa et al. |
| 6,458,915 B1 | 10/2002 | Quillen |
| 6,465,098 B2 | 10/2002 | Mizuguchi et al. |
| 6,472,471 B2 | 10/2002 | Cooke et al. |
| 6,473,024 B2 | 10/2002 | Toyoda et al. |
| 6,498,212 B1 | 12/2002 | Kao et al. |
| 6,500,890 B2 | 12/2002 | Edwards et al. |
| 6,500,915 B1 | 12/2002 | Fujimori et al. |
| 6,503,586 B1 | 1/2003 | Wu et al. |
| 6,506,853 B2 | 1/2003 | Duan |
| 6,541,598 B2 | 4/2003 | Duan et al. |
| 6,559,271 B2 | 5/2003 | Schaaf et al. |
| 6,569,991 B2 | 5/2003 | Nichols et al. |
| 6,572,810 B2 | 6/2003 | Chatterjee et al. |
| 6,573,359 B2 | 6/2003 | Nichols et al. |
| 6,590,069 B2 | 7/2003 | Nichols et al. |
| 6,599,596 B2 | 7/2003 | Nichols et al. |
| 6,601,987 B2 | 8/2003 | Finder et al. |
| 6,649,731 B2 | 11/2003 | Hori et al. |
| 6,660,792 B2 | 12/2003 | Massey et al. |
| 6,710,158 B2 | 3/2004 | Edwards et al. |
| 6,716,904 B2 | 4/2004 | Takahashi |
| 6,727,306 B2 | 4/2004 | Edwards et al. |
| 6,733,873 B2 | 5/2004 | Mizutani et al. |
| 6,773,800 B2 | 8/2004 | Hosoe et al. |
| 6,777,048 B2 | 8/2004 | Quillen |
| 6,780,916 B2 | 8/2004 | Tung et al. |

| | | | | | |
|---|---|---|---|---|---|
| 6,797,401 B2 | 9/2004 | Herron | EP | 1548046 | 6/2005 |
| 6,803,082 B2 | 10/2004 | Nichols et al. | EP | 1239006 | 7/2005 |
| 6,827,897 B2 | 12/2004 | Hall et al. | GB | 673066 | 6/1952 |
| 6,828,272 B2 | 12/2004 | Wiegner et al. | JP | 43 014232 | 6/1968 |
| 6,852,388 B2 | 2/2005 | Murschall et al. | JP | 46-35500 | 10/1971 |
| 6,887,947 B1 | 5/2005 | Schaefer et al. | JP | 46-40711 | 12/1971 |
| 6,896,830 B2 | 5/2005 | Carlton et al. | JP | 46-40713 | 12/1971 |
| 6,896,966 B2 | 5/2005 | Crawford et al. | JP | 46-40714 | 12/1971 |
| 6,953,768 B2 | 10/2005 | Wallace et al. | JP | 46-41025 | 12/1971 |
| 7,332,204 B2 | 2/2008 | Hutchinson et al. | JP | 46-41031 | 12/1971 |
| 2002/0011694 A1 | 1/2002 | Nichols et al. | JP | 48-79896 | 10/1973 |
| 2002/0032300 A1 | 3/2002 | Dowling et al. | JP | 48-44959 | 12/1973 |
| 2002/0087027 A1 | 7/2002 | Lindall et al. | JP | 49 032676 | 9/1974 |
| 2002/0094402 A1 | 7/2002 | Jen | JP | 52-039790 | 3/1977 |
| 2002/0128427 A1 | 9/2002 | Schaaf et al. | JP | 56-149423 | 11/1981 |
| 2002/0136808 A1 | 9/2002 | Rule | JP | 59-015427 | 1/1984 |
| 2002/0137872 A1 | 9/2002 | Schneider et al. | JP | 60-151826 | 8/1985 |
| 2002/0137879 A1 | 9/2002 | Ohmatsuzawa et al. | JP | 60 161949 | 8/1985 |
| 2002/0193555 A1 | 12/2002 | Hori et al. | JP | 61-278558 | 12/1986 |
| 2002/0198297 A1 | 12/2002 | Odorisio et al. | JP | 61-291650 | 12/1986 |
| 2003/0018160 A1 | 1/2003 | Otto et al. | JP | 62-039208 | 2/1987 |
| 2003/0040564 A1 | 2/2003 | Tung et al. | JP | 62-177035 | 8/1987 |
| 2003/0045673 A1 | 3/2003 | Nakajima et al. | JP | 63-264661 | 11/1988 |
| 2003/0046019 A1 | 3/2003 | Nakajima et al. | JP | 63-315604 | 12/1988 |
| 2003/0083191 A1 | 5/2003 | Nakajima et al. | JP | 62-182065 | 1/1989 |
| 2003/0108702 A1 | 6/2003 | Tung et al. | JP | 22-14734 | 8/1990 |
| 2003/0144459 A1 | 7/2003 | Fujimori et al. | JP | 5-287067 | 11/1993 |
| 2003/0216253 A1 | 11/2003 | Wiegner et al. | JP | 06-184333 | 7/1994 |
| 2004/0023000 A1 | 2/2004 | Young et al. | JP | 6-271949 | 9/1994 |
| 2004/0058805 A1 | 3/2004 | Nakajima et al. | JP | 1994271494 | 9/1994 |
| 2004/0077486 A1 | 4/2004 | Bellamy et al. | JP | 62-79599 | 10/1994 |
| 2004/0096609 A1 | 5/2004 | Nichols et al. | JP | 1994306154 | 11/1994 |
| 2004/0101642 A1 | 5/2004 | Quillen et al. | JP | 7-268188 | 10/1995 |
| 2004/0102316 A1 | 5/2004 | Wallace et al. | JP | 1995268188 | 10/1995 |
| 2004/0106767 A1 | 6/2004 | Simon et al. | JP | 09-256220 | 9/1997 |
| 2004/0138057 A1 | 7/2004 | Wenzel | JP | 1999071106 | 3/1999 |
| 2004/0178386 A1 | 9/2004 | Tung et al. | JP | 11-181067 | 7/1999 |
| 2004/0180159 A1 | 9/2004 | Neal et al. | JP | 11 228681 | 8/1999 |
| 2004/0180996 A1 | 9/2004 | Pearson et al. | JP | 11 228682 | 8/1999 |
| 2004/0180997 A1 | 9/2004 | Pearson et al. | JP | 1999236440 | 8/1999 |
| 2004/0185198 A1 | 9/2004 | Sisson et al. | JP | 2000 191764 | 7/2000 |
| 2004/0192813 A1 | 9/2004 | Pearson et al. | JP | 2000302854 | 10/2000 |
| 2004/0224842 A1 | 11/2004 | Wallace et al. | JP | 200126639 | 1/2001 |
| 2004/0225104 A1 | 11/2004 | Wiegner et al. | JP | 2001 098418 | 4/2001 |
| 2004/0235640 A1 | 11/2004 | Sterzel | JP | 2001106693 | 4/2001 |
| 2004/0236066 A1 | 11/2004 | Moore et al. | JP | 2001 163963 | 6/2001 |
| 2004/0241468 A1 | 12/2004 | Otaki | JP | 2001 163964 | 6/2001 |
| 2004/0249113 A1 | 12/2004 | Quillen et al. | JP | 2001 213952 | 8/2001 |
| 2005/0107576 A1 | 5/2005 | Hori et al. | JP | 2001262016 | 9/2001 |
| 2005/0222345 A1 | 10/2005 | Nakayama et al. | JP | 2001 278970 | 10/2001 |
| 2006/0155102 A1 | 7/2006 | Lindall et al. | JP | 2001 323055 | 11/2001 |
| 2006/0222795 A1 | 10/2006 | Howell et al. | JP | 2001 354759 | 12/2001 |
| 2006/0287471 A1 | 12/2006 | Schreiber et al. | JP | 2001 354760 | 12/2001 |
| 2006/0287472 A1 | 12/2006 | Jernigan | JP | 2001 354761 | 12/2001 |
| 2007/0066735 A1 | 3/2007 | Quillen et al. | JP | 2002 155134 | 5/2002 |
| 2007/0066791 A1 | 3/2007 | Jernigan | JP | 2001 26639 | 8/2002 |
| 2007/0106055 A1 | 5/2007 | Kageyama et al. | JP | 2002 220446 | 8/2002 |
| 2007/0123612 A1 | 5/2007 | Bastioli et al. | JP | 2002 220447 | 8/2002 |
| | | | JP | 2002 220448 | 8/2002 |
| FOREIGN PATENT DOCUMENTS | | | JP | 2002 220449 | 8/2002 |
| | | | JP | 2002 220451 | 8/2002 |
| CN | 1482154 | 3/2004 | JP | 2002 220452 | 8/2002 |
| EP | 0581246 | 2/1994 | JP | 2002 220453 | 8/2002 |
| EP | 0541702 | 9/1996 | JP | 2002 220730 | 8/2002 |
| EP | 0465040 | 1/1997 | JP | 2002 220732 | 8/2002 |
| EP | 0884365 | 12/1998 | JP | 2002 220733 | 8/2002 |
| EP | 0921144 | 6/1999 | JP | 2002 220734 | 8/2002 |
| EP | 1152035 | 11/2001 | JP | 2002 220735 | 8/2002 |
| EP | 1153953 | 11/2001 | JP | 2002 220764 | 8/2002 |
| EP | 1477506 | 11/2004 | JP | 2002 220774 | 8/2002 |
| EP | 1227117 | 12/2004 | JP | 2002 227033 | 8/2002 |
| EP | 1516892 | 3/2005 | JP | 2002 227037 | 8/2002 |
| EP | 1535944 | 6/2005 | JP | 2002 227038 | 8/2002 |

| | | |
|---|---|---|
| JP | 2002 227054 | 8/2002 |
| JP | 2002 240133 | 8/2002 |
| JP | 2002 241479 | 8/2002 |
| JP | 2002 241482 | 8/2002 |
| JP | 2002 242043 | 8/2002 |
| JP | 2002 242051 | 8/2002 |
| JP | 2002 242057 | 8/2002 |
| JP | 2002 242062 | 8/2002 |
| JP | 2002 248725 | 9/2002 |
| JP | 2002 249558 | 9/2002 |
| JP | 2002 249559 | 9/2002 |
| JP | 2002 249569 | 9/2002 |
| JP | 2002 322250 | 11/2002 |
| JP | 2002 322254 | 11/2002 |
| JP | 2002 327052 | 11/2002 |
| JP | 2002322258 | 11/2002 |
| JP | 2002332337 | 11/2002 |
| JP | 2003 040993 | 2/2003 |
| JP | 2003040992 | 2/2003 |
| JP | 2003113230 | 4/2003 |
| JP | 2003113232 | 4/2003 |
| JP | 2003171454 | 6/2003 |
| JP | 2003171455 | 6/2003 |
| JP | 2003268093 | 9/2003 |
| JP | 2003301038 | 10/2003 |
| JP | 2003306538 | 10/2003 |
| JP | 2003306601 | 10/2003 |
| JP | 2004035659 | 2/2004 |
| JP | 2004035660 | 2/2004 |
| JP | 2004 075955 | 3/2004 |
| JP | 2004067733 | 3/2004 |
| JP | 2004156055 | 6/2004 |
| JP | 2004197088 | 7/2004 |
| JP | 2004204138 | 7/2004 |
| JP | 2004224858 | 8/2004 |
| JP | 2004256633 | 9/2004 |
| JP | 2004323627 | 11/2004 |
| JP | 2005023160 | 1/2005 |
| JP | 2005047960 | 2/2005 |
| JP | 2005047961 | 2/2005 |
| JP | 2005047962 | 2/2005 |
| JP | 2005187556 | 7/2005 |
| JP | 2005187557 | 7/2005 |
| JP | 2005187558 | 7/2005 |
| JP | 2005187559 | 7/2005 |
| JP | 2005187560 | 7/2005 |
| JP | 2005187561 | 7/2005 |
| JP | 2005220234 | 8/2005 |
| JP | 2005213291 | 11/2005 |
| JP | 2005213292 | 11/2005 |
| JP | 2005213293 | 11/2005 |
| WO | WO 8202393 | 7/1982 |
| WO | WO 97/44376 | 11/1997 |
| WO | WO 99/57173 | 11/1999 |
| WO | WO 01/21680 | 3/2001 |
| WO | WO 01/46306 | 6/2001 |
| WO | WO 01/47688 | 7/2001 |
| WO | WO 02/18472 | 3/2002 |
| WO | WO 02/42537 | 5/2002 |
| WO | WO 02/051616 | 7/2002 |
| WO | WO 02/068497 | 9/2002 |
| WO | WO 02/072665 | 9/2002 |
| WO | WO 03/010226 | 2/2003 |
| WO | WO 2004/065452 | 8/2004 |
| WO | WO 2004/074365 | 9/2004 |
| WO | WO 2004/078825 | 9/2004 |
| WO | WO 2004/101645 | 11/2004 |
| WO | WO 2005/068531 | 7/2005 |
| WO | WO 2005/075539 | 8/2005 |
| WO | WO 2005/085257 A1 | 9/2005 |
| WO | WO 2005/095516 | 10/2005 |

OTHER PUBLICATIONS

Plastic Additives Handbook $5^{th}$ Ed., 2001, pp. 123-136, Hanser Gardner Publications.

Fred W. Billmeyer, Jr., Methods for Estimating Intrinsic Vicosity, Journal of Polymer Science, 4, 1949, pp. 83-86, E.I. du Pont de Nemours and Co., Arlington, New Jersey.

Carl W. Fuller, Colored Iron Oxide Pigments, Synthetic Pigment Handbook, 1973, pp. 323-349, vol. 1, John Wiley and Sons, New York.

Fred W. Billmeyer, Jr., Principles of Color Technology, Describing Color, 1981, pp. 25-66, John Wiley and Sons, New York.

Kirk Othmer, Titanium and Titanium Alloys, Encyclopedia of Chemical Technology, vol. 24, $4^{th}$ Ed., 1997, pp. 186-224; 225-349 and 801.

Louis E. Toth, Transition Metal Carbide and Nitrides, General Properties, Preparation and Characterization, 1971, p. 1-28, Academic Press New York.

Kirk Othmer, Encyclopedia of Chemical Technology, vol. 17, $4^{th}$ Ed., 1996, pp. 108-127.

Kirk Othmer, Encyclopedia of Chemical Technology, vol. 4, $4^{th}$ Ed., 1992, pp. 841-848.

Kirk Othmer, Encyclopedia of Chemical Technology, vol. 4, $4^{th}$ Ed., 1997, pp. 423-430.

Kirk Othmer, Encyclopedia of Chemical Technology, vol. 25, $4^{th}$ Ed., 1998, pp. 872-873.

Kirk Othmer, Encyclopedia of Chemical Technology, vol. 23, $4^{th}$ Ed., 1997, p. 676.

Kirk Othmer, Encyclopedia of Chemical Technology, vol. 6, $4^{th}$ Ed., 1998, pp. 228-311.

Kirk Othmer, Encyclopedia of Chemical Technology, vol. 24, $4^{th}$ Ed., 1998, pp. 572-602.

Kirk Othmer, Encyclopedia of Chemical Technology, vol. 14., $4^{th}$ Ed., 1998, pp. 829-902.

Kirk Othmer, Encyclopedia of Chemical Technology, vol. 17, $4^{th}$ Ed., 1998, pp. 1-42; 43-67.

Kirk Othmer, Encyclopedia of Chemical Technology, vol. 12, $4^{th}$ Ed., 1998, pp. 863-881.

Kirk Othmer, Encyclopedia of Chemical Technology, vol. 22, $4^{th}$ Ed., 1997, pp. 256-278.

Kirk Othmer, Encyclopedia of Chemical Technology, vol. 16, $4^{th}$ Ed., pp. 925-962.

D.C. Allport and A.A. Mohajer, Block Copolymers, 1973, pp. 264-270, John Wiley and Sons, New York.

M.E. Stewart, A.J. Cox, D.M. Naylor, Reactive Processing of poly-(ethylene 2,6-naphthalene dicarboxylate)/poly(ethylene terephthalate) Blends, Polymer, 1993, pp. 4060-4067, vol. 34, No. 19; Butterworth-Heinemann Ltd.

Liu et al., Improving Oxygen Barrier Properties of Poly(ethylene terephthlate) by incorporating isophthalate. I. Effect of Orientation, Journal of Applied Science, Nov. 15, 2005, 98(4), pp. 1615-1628, Wiley Periodicals, Inc.

Co-pending U.S. Appl. No. 11/511,719, filed Aug. 29, 2006.

Co-pending U.S. Appl. No. 11/711,345, filed Feb. 27, 2007.

Co-pending U.S. Appl. No. 11/495,870, filed Jul. 28, 2006.

Research Disclosure 39771; Anonymous; May 1997.

A. Boehm and A. Glaser, The quaterrylimides—highly efficient NIR absorbers for plastics, ANTEC paper 2004, Chicago, IL, May 2004.

Wu, S., A Generalized Criterion for Rubber Toughening: The Critical Matrix Ligament Thickness, Journal of Applied Polymer Science, vol. 35, pp. 549-561, 1988, John Wiley and Sons.

Weissmann, Mariana, et al.; "Theoretical study of cabon-coated iron nanowires"; Physical Review B70, 201401-1 through 201401-4; 2004; The American Physical Society.

Zhang, Z.D. et al.; "Shell/core structure and magnetic properties of carbon-coated Fe-Co © nanocapsules"; Journal of Physics: Condensed Matter 13; 1921-1929; 2001; Institute of Physics Publishing Ltd.

Encyclopedia of Chemical Technology; $4^{th}$ Ed; vol. 4; pp. 1015-1037; John Wiley and Sons, New York.

Pierson, H.O.; Handbook of Carbon, Graphite, Diamond and Fullerenes: Properties and Applications; pp. 122-140; Noyes Publications; 1993.

Notification of Transmittal of the International Search Report and the Written Opinion of the International Searching Authority, or the Declaration from PCT/US06/34616.

Notification of Transmittal of the International Search Report and the Written Opinion of the International Searching Authority, or the Declaration from PCT/US06/34543.

Office Action dated May 27, 2008 from copending U.S. Appl. No. 11/495,870.

Tomita, K.; "Studies on the formation of poly(ethylene Terephthalate): 6. Catalytic activity of metal compounds in polycondensation of bis(2-hydroxyethyl) Terephthalate"; Polymer, vol. 17, pp. 221-224 (1976).

Hovenkamp, S. G.; "Kinetic Aspects of Catalyzed Reactions in the Formation of Poly(ethylene Terephthalate)"; Journal of Polymer Science: Part A-1, vol. 9, pp. 3617-3625 (1971).

Hans Meerwein and Theodor Bersin, Investigations of Metal Alcoholates and Ortho Acid Esters, Annalen der Chemie, Chemical Insitute of Marburg University, 1929, pp. 113-150, vol. 454765.

Hans Meerwein, Increase in Ionization Capacity of Weak Electrolytes as a Result of Complex Formation and its Significance for Catalytic Processes, Annalen der Chemie, Chemical Insitute of Konigsberg University, 1927, pp. 222-253, vol. 455.

Office Action dated Mar. 10, 2009 from co-pending U.S. Appl. No. 11/511,719.

Časenský, B. et al., "The Chemistry of Sodium Alkoxyaluminium Hydrides. I. Synthesis of Sodium Bis(2-Methoxyethoxy)Aluminium Hydride," Collection of Czechoslovak Chemical Communications, May 1970, pp. 2648-2657, vol. 36.

Časenský, B. et al., The Chemistry of Sodium Alkoxyaluminium Hydrides, III. Synthesis of Sodium Dihydro-Bis(2-Methoxyethoxy)-Aluminate from Na, Al, $H_2$, and Aluminium 2-Methoxyethoxide or Sodium Tetrakis(2-Methoxyethoxy)Aluminate, Collection of Czechoslovak Chemical Communications, Jun. 1971, pp. 2537-2543, vol. 37.

Černý, Z. et al, "Alkoxohydridoaluminates: Multinuclear NMR Study of Sodium Hydrido-(2-methoxyethoxo)Aluminates," Journal of Organometallic Chemistry, Oct. 1995, pp. 115-122, vol. 516.

Doan, Kate E., "Synthesis and Electrical Response of Single-Ion Conducting Network Polymers Based on Sodium," Chemistry of Materials, Mar. 1991, pp. 418-423, vol. 3.

Notification of Transmittal of the International Search Report and the Written Opinion of the International Searching Authority, or the Declaration date of mailing Dec. 28, 2007 for PCT/US2007/016909.

Amini, M. Mohammadpour et al.; "Sol-gel processing of β-eucryptite: an [27]Al nuclear magnetic resonance investigation in sol stage"; Materials Chemistry and Physics; Apr. 2002; pp. 81-87.

Francis, Julie A. et al.; "Sterically crowded aryloxides of aluminum: intramolecular coordination of bidentate ligands"; Journal of Organometallic Chemistry; Sep. 1999; pp. 29-37.

Office Action dated Jun. 24, 2009 from co-pending U.S. Appl. No. 11/495,870.

Office Action dated Apr. 14, 2009 from co-pending U.S. Appl. No. 11/495,416.

Office Action dated Jun. 12, 2009 from co-pending U.S. Appl. No. 11/711,345.

MULTIPLE FEEDS OF CATALYST METALS TO A POLYESTER PRODUCTION PROCESS

This application claims priority to U.S. provisional application No. 60/834,081 filed Jul. 28, 2006, incorporated herein by reference.

1. FIELD OF THE INVENTION

The invention pertains to processes for feeding catalyst systems to a melt phase process for the manufacture of polyester polymers, and more particularly, to split catalyst solution feeds to the melt phase process to provide the target amount and ratio of catalyst metals.

2. BACKGROUND OF THE INVENTION

Conventional designs for feeding catalysts to the melt phase process for making polyester polymers call for using a catalyst mix tank and one feed tank system to the desired point on the melt phase process. The point of addition to the melt phase process depends upon the type of esterification, whether direct or ester exchange, and the type of catalyst employed, along with the desired characteristics of the polymer and the desired residence time. We have recently discovered that certain catalyst systems of alkaline earth metal or alkali ("M") and aluminum can be retained in solution at ambient conditions using certain solvents, such as mono-ol ethers or polyhydroxyether solvents as further described below. These catalyst systems are difficult to dissolve in ethylene glycol and readily precipitate on standing at ambient conditions, especially when the molar ratio of M:Al approaches 1:1 and/or when the amount of Al in the solution exceeds 3000 ppm.

We have discovered that catalyst solutions which contain molar ratios of M:Al approaching 1:1 are desirable in order to minimize the formation of yellow color in the polyester polymer, and to provide a catalyst solution that is less hazy and more clear. A catalyst mix tank and single feed system to the melt phase process works well to produce polyester polymers containing the same ratio of M:Al, whether 1:1 or otherwise. However, it is may be the case that one desires to produce a variety of polymers on a single manufacturing line. Depending on the nature of the change desired in the polymer, the change may call for adjusting the molar ratio of M:Al from one type of polyester polymer to another type of polyester polymer. In this case, it would be impractical to design a process which supplies only one fixed catalyst ratio to the melt phase process. Changing out the catalyst ratio in a single mix tank/feed system is impractical because an inventory of the previously used catalyst remains in the mix tank, and renders the process rather inflexible.

Multiple manufacturing lines are often present in a plant. One line may be set to produce one polyester polymer with a certain set of characteristics, while another line in simultaneous operation may be set to produce a polyester polymer with a different set of characteristics, each line requiring a different catalyst ratio of M:Al. Providing a different catalyst mixing tank for each line increases the capital cost of a plant.

It would be desirable to provide a catalyst feed system which does not require depleting the inventory in a catalyst mix tank, which allows rapid adjustments to the catalyst ratio so as to provide quicker change overs to produce different polyester polymers on the same line, or to make necessary catalyst adjustments in the event that a polymer for one reason or another starts to fall off specification on the same line, and/or to provide a less costly system to provide for one mix tank which will feed multiple lines at different catalyst ratios depending on the requirements of each line.

3. SUMMARY OF THE INVENTION

There is now provided a process for feeding metals to one or more melt phase process lines for the production of a polyester polymers comprising:

A. providing a first feed stream, said first feed stream comprising a combination of metals having a first molar ratio;

B. providing a second feed stream, said second feed stream comprising metals of a kind which are less than all the kinds of metals in the first feed stream, or a metal of a kind which is not a metal in said first feed stream, or all of the same kind of metals in said first feed stream but at a second molar ratio different than said first molar ratio; and C. feeding said first stream to one or more melt phase process lines at an addition point on each line and feeding said second feed stream either:

(i) into one or more of the melt phase process lines upstream or downstream of the addition point of the first feed stream into the melt phase lines or (ii) to the first feed stream leading to the one or more melt phase process lines, combining said first and second feed streams to provide a combined feed stream, and feeding the combined feed stream into one or more of the melt phase process lines.

There is also provided a process for making polyester polymers comprising making a polyester polymer 1 from a melt phase production line 1, said polyester polymer 1 comprising a metal A and a metal B in a first molar ratio of A:B, and a polyester polymer 2 from a melt phase production line 2 comprising a metal A and a metal B at a second molar ratio A:B, wherein metal A is different from metal B, the molar ratios of polyester polymer 1 and 2 are different from each other, and each of melt phase production lines 1 and 2 are fed from a common catalyst mix tank supplying metals A and B.

There is further provided a process for making a polyester polymer in a melt phase line comprising feeding a fixed targeted amount of catalyst metals A and B from a catalyst mix tank to the melt phase line and producing a polyester polymer having an amount of metal A that is greater than the amount of metal A fed from the catalyst mix tank to the melt phase process, or an amount of metal B that is greater than the amount of metal B fed from the catalyst mix tank to the melt phase process, or an amount of metals A and B that is greater than the amount of metals A and B fed from the catalyst mix tank to the melt phase process, each without varying the fixed target amount of metals A and B fed from a catalyst mix tank to the melt phase line.

4. BRIEF DESCRIPTION OF THE DRAWINGS

5. DETAILED DESCRIPTION OF THE INVENTION

Figure 1:
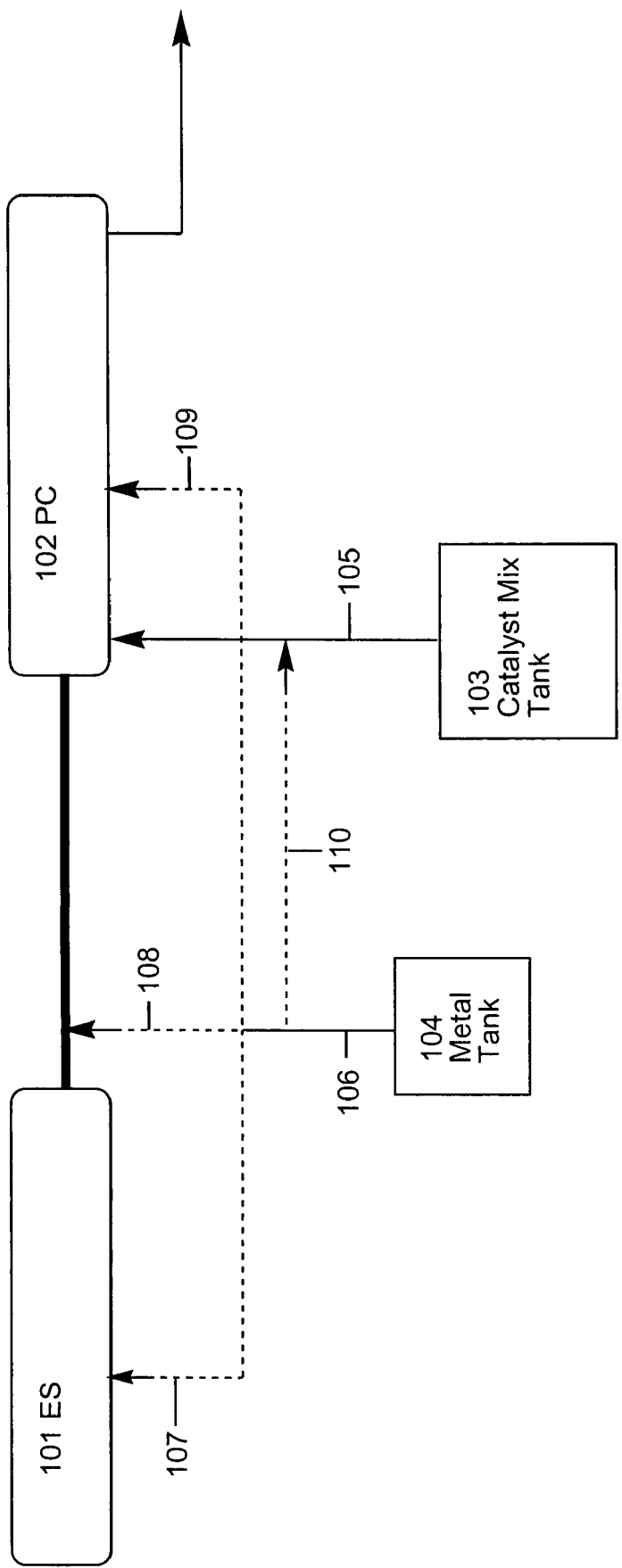
FIG. 1 is a process flow diagram of a catalyst mix tank and a metals tank supplying one melt phase production line.

The present invention may be understood more readily by reference to the following detailed description of the invention.

It must also be noted that, as used in the specification and the appended claims, the singular forms "a," "an" and "the" include plural referents unless the context clearly dictates otherwise. For example, reference to processing or making a "polymer," a "preform," "article," "container," or "bottle" is intended to include the processing or making of a plurality of polymers, preforms, articles, containers or bottles.

References to a composition or solution containing "an" ingredient or "a" polymer is intended to include other ingredients or other polymers, respectively, in addition to the one named.

By "comprising" or "containing" or "having" is meant that at least the named compound, element, particle, or method step etc. must be present in the composition, solution or article or method, but does not exclude the presence of other compounds, catalysts, materials, particles, method steps, etc., even if the other such compounds, material, particles, method steps etc. have the same function as what is named, unless expressly excluded in the claims.

It is also to be understood that the mention of one or more method steps does not preclude the presence of additional method steps before or after the combined recited steps or intervening method steps between those steps expressly identified. Moreover, the lettering of process steps is a convenient means for identifying discrete activities or steps, and unless otherwise specified, recited process steps can be arranged in any sequence.

Expressing a range includes all integers and fractions thereof within the range. Expressing a temperature or a temperature range in a process, or of a reaction mixture, or of a melt or applied to a melt, or of a polymer or applied to a polymer means in all cases that the limitation is satisfied if either the applied temperature, the actual temperature of the melt or polymer, or both are at the specified temperature or within the specified range.

The word "composition" or "solution" means that each listed ingredient is present in the composition or solution, and does not imply that any ingredient in the composition or solution is unbound or unreacted. The composition may be solid or liquid. The stated ingredients in the composition may be bound, unbound, reacted, unreacted, and unless otherwise specified, in any oxidation state. For example, specifying the presence of "aluminum" or "Al" or "lithium" or "Li" means the atoms of aluminum or lithium, respectively, and does not imply that they occupy any oxidation state, any morphological state, any structural state, or any chemical state, whether as added to or as present in the solution, polymer or composition of matter, unless such states are expressly stated.

As used herein, the term "metal" is a metal atom and does not imply any oxidation state or its chemical state. The metals may be in any chemical state, e.g. as a salt or chelate or complex or elemental, and in any oxidation state, unless otherwise expressly stated as having a particular oxidation state. The word "elemental," however, means a zero oxidation state.

The reported amount of a metal (e.g. ppm) is based on the amount of the metal atom present in the solution, polymer, or article and not the amount of the compound or salt, unless expressly stated as the amount of the compound or salt.

The It.V. values described throughout this description are set forth in dL/g units as calculated from the inherent viscosity measured at 25° C. in 60% phenol and 40% 1,1,2,2-tetrachloroethane by weight. Polymer samples are dissolved in the solvent at a concentration of 0.25 g/50 mL. The viscosity of the polymer solutions is determined using a Viscotek Modified Differential Viscometer. A description of the operating principle of the differential viscometers can be found in ASTM D 5225. The inherent viscosity is calculated from the measured solution viscosity. The following equations describe such solution viscosity measurements and subsequent calculations to Ih.V. and from Ih.V. to It.V:

$$\eta_{inh} = [\ln(t_s/t_o)]/C$$

where
  $\eta_{inh}$=Inherent viscosity at 25° C. at a polymer concentration of 0.5 g/100 mL of 60% phenol and 40% 1,1,2,2-tetrachloroethane by weight
  ln=Natural logarithm
  $t_s$=Sample flow time through a capillary tube
  $t_o$=Solvent-blank flow time through a capillary tube
  C=Concentration of polymer in grams per 100 mL of solvent (0.50%)

The intrinsic viscosity is the limiting value at infinite dilution of the specific viscosity of a polymer. It is defined by the following equation:

$$\eta_{int} = \lim_{C \to 0}(\eta_{sp}/C) = \lim_{C \to 0}(\ln \eta_r)/C$$

where $\eta_{int}$=Intrinsic viscosity
  $\eta_r$=Relative viscosity=$t_s/t_o$
  $\eta_{sp}$=Specific viscosity=$\eta_r-1$ Instrument calibration involves triplicate testing of a standard reference material and then applying appropriate mathematical equations to produce the "accepted" Ih.V. values. The three values used for calibration shall be within a range of 0.010; if not, correct problems and repeat testing of standard until three consecutive results within this range are obtained.

Calibration Factor=Accepted *Ih.V.* of Reference Material/Average of Triplicate Determinations The uncorrected inherent viscosity ($\eta_{inh}$) of each sample is calculated from the Viscotek Model Y501 Relative Viscometer using the following equation:

$$\eta_{inh} = [\ln(P_2/KP_1)]/C$$

Where
  $P_2$=The pressure in capillary $P_2$
  $P_1$=The pressure in capillary $P_1$
  ln=Natural logarithm
  K=Viscosity constant obtained from baseline reading
  C=Concentration of polymer in grams per 100 mL of solvent The corrected Ih.V., based on calibration with standard reference materials, is calculated as follows:

Corrected *Ih.V.*=Calculated *Ih.V.*×Calibration Factor

The intrinsic viscosity (It.V. or $\eta_{int}$) may be estimated using the Billmeyer equation as follows:

$$\eta_{int} = 0.5[e^{0.5 \times Corrected\ Ih.V.} - 1] + (0.75 \times Corrected\ Ih.V.)$$

The reference for estimating intrinsic viscosity (Billmeyer relationship) is J. *Polymer Sci.*, 4, pp. 83-86 (1949).

Alternatively, the It.V. can be measured using the above solvents and concentrations measured according to ASTM D 5225-98 using a differential viscometer.

The weight of alkaline earth metal or alkali can be measured or calculated upon addition to the melt phase or by analytical techniques for detecting the amount in the finished polymer or article. Suitable detection methods for the presence of alkali metals or alkaline earth metals include inductively coupled plasma optical emission spectroscopy (ICP-OES). The concentration of an alkaline earth metal or an alkali metal or aluminum or phosphorus or any other element or metal is reported as the parts per million of metal atoms based on the weight of the polymer.

There is now provided a process for feeding metals to one or more melt phase process lines for the production of a polyester polymers comprising:

A. providing a first feed stream, said first feed stream having a first molar ratio and comprising a mixture of metal A and a different metal B;

B. providing a second feed stream, said second feed stream comprising metals of a kind which are less than all the kinds of metals in the first feed stream, or a metal of a kind which is not a metal in said first feed stream, or all of the same kind of metals in said first feed stream but at a second molar ratio different than said first molar ratio; and C. feeding said first stream to one or more melt phase process lines at an addition point on each line and feeding said second feed stream either:

(i) into one or more of the melt phase process lines upstream or downstream of the addition point of the first feed stream into the melt phase lines or (ii) to the first feed stream leading to the one or more melt phase process lines, combining said first and second feed streams to provide a combined feed stream, and feeding the combined feed stream into one or more of the melt phase process lines.

The kinds of metals employed in the first feed stream are any metal which, together or alone, increase the reaction rate or promote the esterification, or ester exchange, or polycondensation of polyester polymers in the melt phase. Typical kinds of metals include titanium, tin, antimony, manganese, cobalt, germanium, zinc, aluminum, and alkaline earth metal or alkali metals such as lithium, sodium, potassium, magnesium, calcium, and combinations thereof. The catalytic metals may be added into the esterification zone, polycondensation zone, or at any point in-between these zones. Typical catalyst compounds added to a melt phase process include the titanium alkoxides; tin (II) or (IV) esters; zinc, manganese, or magnesium acetates or benzoates; antimony trioxide, carboxylic acid salts of aluminum or alkoxides of aluminum; and the hydroxides of alkaline earth metal or alkali metals.

The melt phase process as used herein means the process used to prepare a polyester polymer, beginning with reactants and ending with solid polymer. A melt phase process line is a production line for making polyester polymers in the melt phase. Each production line may, if desired, be split into multiple polycondensation lines or have multiple cutters for making polyester granules.

The particular method used to make the polyester polymer is not limited. The method of the invention can be applied to any method for making polyester polymers in a melt phase process, preferably a continuous melt phase process. An illustrative melt phase process can be described as follows.

The process begins with an esterification zone. In the esterification zone, one or more dicarboxylic acids, preferably aromatic dicarboxylic acids, or ester forming derivatives thereof, and one or more diols, such as ethylene glycol, can be mixed in a paste tank and the paste is then continuously fed to an esterification reactor operated at a temperature of between about 200° C. and 300° C., and at a super-atmospheric pressure of between about 1 psig up to about 70 psig. The residence time of the reactants typically ranges from between about one and five hours. Normally, the dicarboxylic acid(s) is directly esterified with diol(s) at elevated pressure and at a temperature of about 240° C. to about 285° C. The esterification reaction is continued until a acid or ester group conversion of at least 70% is achieved, but more typically until a acid or ester group conversion of at least 85% is achieved to make the desired oligomeric mixture (or otherwise also known as the "monomer").

The resulting oligomeric mixture formed in the esterification zone (which includes direct esterification and ester exchange processes) includes bis(2-hydroxyethyl)terephthalate (BHET) monomer, low molecular weight oligomers, DEG, and trace amounts of water as the condensation by-product not totally removed in the esterification zone, along with other trace impurities from the raw materials and/or possibly formed by catalyzed side reactions, and other optionally added compounds such as toners and stabilizers. The relative amounts of BHET and oligomeric species will vary depending on whether the process is a direct esterification process in which case the amount of oligomeric species are significant and even present as the major species, or a ester exchange process in which case the relative quantity of BHET predominates over the oligomeric species. Water is removed as the esterification reaction proceeds in order to drive the equilibrium toward the desired products. Methanol is removed as the ester exchange reaction of a dimethyl ester of a dicarboxylic acid proceeds in order to drive the equilibrium toward the desired products. The esterification zone typically produces the monomer and oligomer species, if any, continuously in a series of one or more reactors. Alternately, the monomer and oligomer species in the oligomeric mixture could be produced in one or more batch reactors. It is understood, however, that in a process for making PEN, the reaction mixture will contain the monomeric species bis(2-hydroxyethyl)-2,6-naphthalate and its corresponding oligomers. At this stage, the It.V. is usually not measurable or is less than 0.1 dL/g. The average degree of polymerization of the molten oligomeric mixture is typically less than 15, and often less than 7.0.

Once the oligomeric mixture is made to the desired percent conversion of the acid or ester groups, it is transported typically via a pipe from the esterification zone or reactors to the polycondensation zone. The commencement of the polycondensation reaction is generally marked by either a higher actual operating temperature than the operating temperature in the esterification zone, or a marked reduction in pressure (usually sub-atmospheric) compared to the esterification zone, or both. Typical polycondensation reactions occur at temperatures ranging from about 260° C. and 300° C., and at sub-atmospheric pressure of between about 350 mmHg to 0.2 mm Hg. The residence time of the reactants typically ranges from between about 2 to about 6 hours. In the polycondensation reaction, a significant amount of glycol is evolved by the condensation of the oligomeric ester species and during the course of molecular weight build-up.

In some processes, polycondensation reactions are initiated and continued in the melt phase in the polycondensation zone divided into a prepolymerization zone and finished in the melt phase in a finishing zone, after which the melt is solidified to form the polyester polymer melt phase product, generally in the form of chips, pellets, or any other shape.

Each zone may comprise a series of one or more distinct reaction vessels operating at different conditions, or the zones may be combined into one reaction vessel using one or more sub-stages operating at different conditions in a single reactor. That is, the prepolymer stage can involve the use of one or more reactors operated continuously, one or more batch reactors, or even one or more reaction steps or sub-stages performed in a single reactor vessel. The residence time of the melt in the finishing zone relative to the residence time of the melt in the prepolymerization zone is not limited. For example, in some reactor designs, the prepolymerization zone represents the first half of polycondensation in terms of reaction time, while the finishing zone represents the second half of polycondensation. Other reactor designs may adjust the residence time between the finishing zone to the prepolymerization zone at about a 1.5:1 ratio or higher. A common distinction between the prepolymerization zone and the finishing zone in many designs is that the latter zone frequently operates at a higher temperature and/or lower pressure than the operating conditions in the prepolymerization zone. Generally, each of the prepolymerization and the finishing zones comprise one or a series of more than one reaction vessel, and the prepolymerization and finishing reactors are sequenced in a series as part of a continuous process for the manufacture of the polyester polymer.

Reference will be made to FIG. 1 to illustrate one embodiment of the invention. A first melt phase line is made up of the esterification zone 101 and a polycondensation zone 102. The particular number of vessels or mode of operation is not limited, and one of the many modes of operation is as described above. The product of the esterification zone 101 is desirably in fluid connection with the polycondensation zone 102 through a pipe as illustrated or by any other suitable means, such as a unitary vessel combining the two zones.

A catalyst mix tank 103 is provided the source for the first feed stream to the melt phase process. The first feed stream may proceed through a pipe 105 and as a first feed stream into the melt phase line at any suitable point, or enter into the melt phase line as a combined stream at any suitable point (discussed further below). The particular point of addition is not particularly limited. As depicted, the first feed stream may be fed at the front end or the initiation of the polycondensation zone, but may also be fed at the pipe connecting the esterification zone with the polycondensation zone, or at the end of the esterification zone, or at any other desired point in the melt phase process.

The first feed stream will have a set or fixed molar ratio of a combination of metals. There are at least two metals, and three or four or more metals may be employed. For simplicity, reference is made to a mix of metals A and B, although it is to be understood that other metals may be included. Each metal is, by itself or together with another metal in the first feed stream or the second feed stream, a polycondensation catalyst or catalyst system, used herein interchangeably. Thus, taking a metal A and a metal B as an example, Metal A is any metal, which together with metal B or alone, is a polycondensation catalyst provided that metal A and B are not the same metals. Metals A and B may not be effective as polycondensation catalysts individually, but together make an effective catalyst system; or only one of metals A and B may be effective as polycondensation catalysts, but together further increase the polycondensation reaction rate. Alternatively, the catalytic activity of one of the metals may be too high such that while conversion is high and fast, selectivity is poor and numerous undesirably by-products are formed, but when combined with another metal, the activity of the catalyst system is moderated. Alternatively, one of the metals may not have any catalytic activity whatsoever. Any combination of metals which are combined for any reason are useful provided that the combination of metals as a system provides catalytic activity in the sense of increasing the reaction rate of the polycondensation reaction relative to the absence of all the metals in the first feed stream and second feed stream. While metals A and B are mentioned, the first feed stream may contain any number of additional metals.

The feeds of metal in the first feed stream may be added to the melt phase process as a solution, a dispersion, or a slurry.

The source of the second feed stream is from metal tank 104. This tank holds metals of a kind which are less than all the kinds of metals in the first feed stream, or a metal of a kind which is not a metal in said first feed stream, or all of the same kind of metals in said first feed stream but at a second molar ratio different than said first molar ratio. Taking only two metals A and B in the first feed stream as an example, the metals in the metals tank 104 present in the second feed stream are only one of metal A or metal B, or neither of metal A nor metal B, or both metal A and metal B at a second molar ratio different than said first molar ratio Each one of these options are discussed in further detail.

Metal tank 104 is designed to adjust the catalyst ratio of all the metals (e.g. metal A and B) in the polyester polymer produced in a melt phase line as needed or desired to provide enhanced production flexibility to produce polymers having different properties without having to wait until the inventory in catalyst mix tank 103 is depleted to make the change, to provide on the fly flexibility to make adjustments to the catalyst ratios if the polymer produced is off-specification, and to take advantage of enhanced properties by adding a portion of one or more of the metals at different points in the process. The process of the invention also reduces capital cost associated with having two catalyst mix tanks and even more than two catalyst mix tanks needed to produce a polymer with the final desired molar ratio of catalyst components.

Thus, there is now provided a process for making a polyester polymer in a melt phase line comprising feeding a fixed targeted amount of catalyst metals A and B from a catalyst mix tank to the melt phase line and producing a polyester polymer having an amount of metal A that is greater than the amount of metal A fed from the catalyst mix tank to the melt phase process, or an amount of metal B that is greater than the amount of metal B fed from the catalyst mix tank to the melt phase process, or an amount of metals A and B that is greater than the amount of metals A and B fed from the catalyst mix tank to the melt phase process, each without varying the fixed target amount of metals A and B fed from a catalyst mix tank to the melt phase line.

In the next three embodiments described, the first feed stream will contain metals A and B as an illustration, although it is to be understood that three or more kinds of metals may be present in the first feed stream.

In one embodiment, catalyst mix tank 103 has a first ratio of metals A and B, and metals tank 104 contains only one of metals A or B, but not both. In this embodiment, other metals besides A and B may be included if desired. For example, metals A and B in the catalyst mix tank 103 can be Ti and Co, and the metal in metals tank can be Co, or it can be Ti, or it can be Co and Zn, or Ti and Zn, but not both Co and Ti.

In a second embodiment, catalyst mix tank 103 has a first ratio of metals A and B, and metals tank 104 does not contain either metal A or B, but rather contains a metal C that is a different metal from metals A and B. For example, metals A and B in the catalyst mix tank 103 can be Ti and Co, and the metal in metals tank can be Zn, or Mg, but it cannot be either Ti or Co.

In a third embodiment, catalyst mix tank 103 has a first ratio of metals A and B, and metals tank contains both metals A and B, but a second mole ratio which is different than the first mole ratio. Thus, if the first mole ratio is 1:1, the second mole ratio can be anything but 1:1.

As mentioned above, three or more metals may be present in the first feed stream. Thus, in the first embodiment, the first feed stream many contain metals A, B, and C, and the second feed stream may then contain either metals A and B, or A and C, or B and C, or A alone, or B alone, or C alone. In the second embodiment using metals A, B and C in the first feed stream, the second feed stream would not contain any of A, B, or C, but rather contain metal D, E, etc. In the third embodiment, the second feed stream would contain metals A, B, and C, but at a different mole ratio than the first mole ratio.

The first stream is fed through pipe 105 to the melt phase process line at any desired addition point on the melt phase line. There are a variety of directions the second feed stream may take as it enters into the melt phase line. The second feed stream is fed either:
(i) into one or more of the melt phase process lines upstream or downstream of the addition point of the first feed stream into the melt phase lines or
(ii) to the first feed stream leading to the one or more melt phase process lines, combining said first and second feed streams to provide a combined feed stream, and feeding the combined feed stream into one or more of the melt phase process lines.

Option (i) as illustrated in FIG. 1 as second feed stream in line 106 proceeding through line 107 and added into the esterification 101 zone, which is a point of addition before and upstream of the addition point of the first feed stream. Alternatively, the second feed stream in line 106 may proceed through line 109 and is added into the polycondensation zone 102 at a point after or downstream of the addition point of the first feed stream 105. If the second feed stream is fed at an addition point after the first feed stream, it is desirably fed at a point before the It.V. of the melt in the polycondensation zone reaches 0.3 dL/g, or within about 20 minutes, or within about 10 minutes, after the first feed stream is added, measured from time 0 as the polymer combined with first feed stream to the point where it flows within the designated time or at a point in a reaction vessel where the polymer has reacted for the designated time. Alternatively, the second feed stream in line 106 may proceed through line 108 for addition into a conduit connecting the esterification zone 101 and the polycondensation zone 102, which as depicted, is a point of addition before or upstream of the first feed stream addition point. If desired, the second feed stream may be fed within merely 10 meters, or within 5 meters, or within 3 meters, or within 1 meter of the first feed stream addition point.

Option (ii) as illustrated in FIG. 1 as the second feed stream 106 proceeding through line 110 to combine with the first feed stream in line 105 at a juncture before the first feed stream 105 enters into the melt phase line. The first feed stream and the second feed stream are combined at a juncture to provide a combined feed stream, followed by feeding the combined feed stream to any desired addition point into the melt phase line The feed system for the second feed stream may be built with one addition point to the melt phase line, or with a plurality of addition points to the melt phase line.

Figure 2:
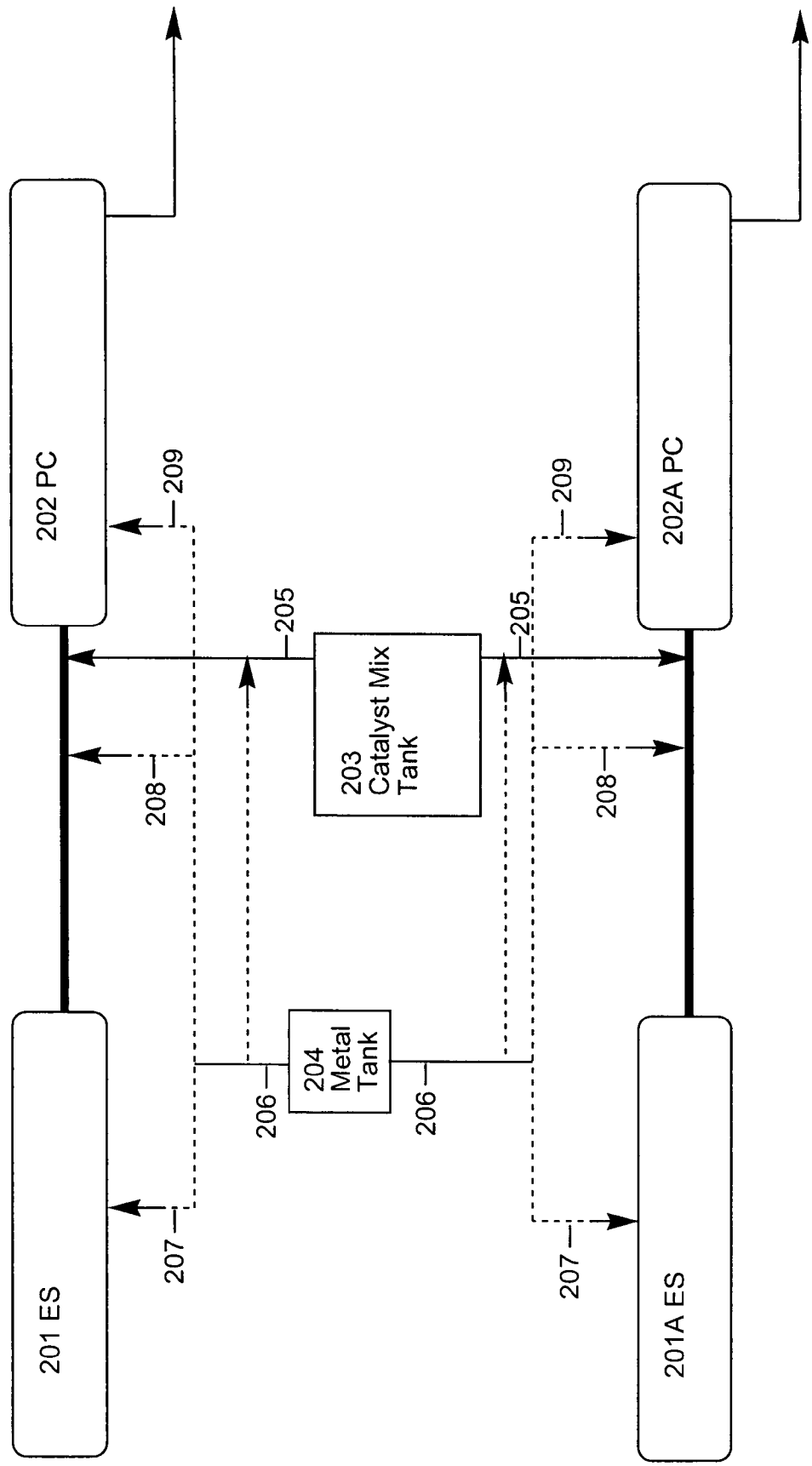
FIG. 2 is a process flow diagram of a catalyst mix tank supplying two melt phase production lines and a metals tank supplying one or both of the melt phase production lines.

FIG. 2 illustrates another embodiment of the invention. In this embodiment, the catalyst mix tank 203 feed multiple melt phase lines, a first melt phase line having an esterification zone 201 and a polycondensation zone 202 and a second melt phase line having an esterification zone 201A and a polycondensation zone 202A. The first feed stream of catalyst metals are fed through lines 205 to each of the melt phase lines. The metals tank 204 is the source of the second feed stream. The second feed stream is fed to one of the melt phase lines, or to a combination of melt phase lines, as many as desired. For example, the second feed stream may feed only one but not both of the melt phase lines because the polymers produced on a first melt phase line are made with a first catalyst ratio and the polymers produced on a second melt phase line are made with a modified catalyst ratio, the modification effected by the addition of the second feed stream to the second melt phase line. Alternatively, if a variety of polymers are produced on each line, then the second feed stream may be fed to two or more of the melt phase lines.

As illustrated in FIG. 2, the second feed stream may be fed one or both of the melt phase lines through line 206. As described above, the second feed stream can be added to the first melt phase line through any one or more of lines 207, 208, or 209, or fed to the first feed stream into line 205 to provide a combined stream fed to the first melt phase line. While the second feed stream is fed to the first melt phase line, the first feed stream is fed to both the first melt phase line and the second melt phase line. Optionally, the second feed stream can simultaneously be metered or fed into the second melt phase line at any addition point 207, 208, and/or 209, or to the first feed stream line 205 to provide a combined feed into the second melt phase line.

The process preferably is conducted continuously. Preferably, the first and second melt phase lines are a continuous process. More preferably, the first feed stream and the second feed stream are fed continuously to at least a melt phase line, and if multiple melt phase lines are present, the a single catalyst tank having a fixed first catalyst ratio provides the first feed stream fed continuously to at least two melt phase lines, with the second feed stream fed to one or said at least two melt phase lines fed by the first feed stream.

The molar ratio of metals in the first feed stream to the melt phase process is desirably fixed. The particular molar ratio is set by the molar ratio target of metals blended in the catalyst mix tank. There will be some minor fluctuations in the molar ratio of metals actually fed to the melt phase process in the first feed stream due to such variables as potential precipitation, settling, or filling up the catalyst mix tank with fresh make up catalyst when old inventory remains in the mix tank, among other reasons. Nevertheless, the target mole ratio the metals in the catalyst mix tank is fixed each time the mix tank is replenished with make up metals, or if continuously made up in the mix tank, then the target mole ratio is fixed at least over 5 days or production run time.

In one embodiment, the catalyst metals in the catalyst mix tank are at least aluminum and an alkaline earth metal or alkali metal, such as sodium and/or lithium. The metals tank 106 or 206 contain one or more of the alkaline earth metal or alkali compounds, but not aluminum. The alkaline earth metal or alkali metals for a second feed stream which may be added to the esterification zone before, during, or after completion of esterification, or between the esterification zone and polycondensation zone, or at a point when polycondensation starts.

The catalyst metals A and/or B in the second feed stream of the invention may be added before 50% conversion of the esterification reaction mixture. In another embodiment, the second feed stream is added to a paste tank or to the feed of paste to an esterification reactor or to the first esterification reactor.

The second feed stream addition point and/or quantity can alter the properties of the polymer produced in a melt phase process. For example, adding an alkaline earth metal or alkali metal, and in particular lithium, early in the melt phase process, such as to the esterification zone and more particularly to the paste tank within the esterification zone, or at least before 50% conversion, will reduce the diethylene glycol (DEG) or DEG residue content in the polyester polymer produced by the melt phase process. A reduction in the DEG content is quite beneficial if the polymer is designed to make or suitable for the manufacture of heat set blow molded bottles. The typical DEG content in polyester polymer is about 2 mole percent in a continuous process. The DEG content by adding lithium early in the melt phase process, such as before 50% esterification (which includes ester exchange), can be reduced relative to no addition of lithium to the esterification zone. The degree of reduction can be at least 10%, or at least 20%, or at least 30%.

By adding metals A and/or B in the second feed stream, such as an alkaline earth metal or alkali metal, and in particular Li, to a melt phase process, the molar ratio of A:B in the polyester polymer, such as Li:Al, will be increased over the molar ratio of A:B present in the first feed stream.

Molar ratios of Li:Al in the polyester polymer which approach 1:1 (e.g. from 05:1 to 1.5:1) are preferred to control the formation of yellow color bodies in the polymer. Adding a quantity of Li as the second feed stream which significantly increases the molar ratio of Li:Al beyond 1:1 in the polyester polymer, such as to a ratio of 5:1, will result in the formation of significant yellow color in the polymer as determined by the b* color measurements.

It may be desirable to provide two melt phase lines, one which produces a polyester polymer having a good b* color below 5, or below 4, or 3 or less as measured on a preform made with the polymer, and a second melt phase line which produces a polyester polymer having low DEG content, e.g. below 2 mole %, or 1.5 mole % or less, or 1 mole % or less, or 0.75 mole % or less. In this embodiment, the catalyst mix tank 203 will supply both lines at metals A and B, such as Li:Al, at a mole ratio of at least 0.5:1, or at least 0.75:1, or at least 0.8:1, or at least 0.9:1, and up to 3:1, or up to 2.5:1, or up to 2:1, or up to 1.7:1, or up to 1.5:1, or up to 1.3:1, or up to 1.2:1, or up to 1.1:1. In one embodiment the Li:Al mole ratio ranges from 0.8:1 to 1.5:1, or 0.9:1 to 1.2:1. One melt phase line is supplied without a second feed stream, while a second melt phase line is supplied with a second feed stream of additional quantities of metal A or B, such as Li, sufficient to raise the molar ratio of A:B, such as Li:Al, by at least 25%, or at least 35%, or at least 40%, or at least 50%, or at least 75%, or at least 90%, or at least 100%, or at least 150%, or at least 200%, and up to about 2000%, or up to about 1000%, or up to about 500%. In another aspect, sufficient alkaline earth metal or alkali metal, such as Na or Li, is added to increase the ratio of the alkaline earth metal or alkali metal:Al from 0.5:1 to 2:1 up to a range between 3:1 to 10:1, or 3:1 to 7:1, or to 3:1 to 5:1.

Thus, there is provided a continuous process for making polyester polymers on at least two melt phase lines fed by a common first feed stream of a catalyst composition having a fixed molar ratio wherein the polymers produced on at least one of the melt phase lines has a catalyst ratio that is different than the catalyst ratio in the first feed stream. Accordingly, there is provided a process for making polyester polymers comprising making a polyester polymer 1 from a melt phase production line 1, said polyester polymer comprising a metal A and a metal B in a first molar ratio of A:B, and a polyester polymer 2 from a melt phase production line 2 comprising a metal A and a metal B at a second molar ratio A:B, wherein metal A is different from metal B, the molar ratios of polyester polymer 1 and 2 are different from each other, and each of melt phase production lines 1 and 2 are fed from a common catalyst mix tank supplying metals A and B.

In one embodiment, the catalyst system comprises aluminum and at least one of an alkaline earth metal or alkali metal. The aluminum compound, and more broadly any one of metals A or B or both, is desirably added to the oligomer mixture upon or after completion of esterification or to a polyester melt no later than when the It.V. of the melt reaches 0.3 dL/g, or no later than when the It.V. of the melt reaches 0.2 dL/g, and more preferably to the oligomer mixture exiting the esterification zone or prior to commencing or at the start of polycondensation.

The invention allows one to employ a first feed stream having molar ratio of A:B, such as alkaline earth metal or alkali metals:Al, and in particular Li:Al, approaching a 1:1 mole ratio (from 0.5:1 to 1.5:1, or 0.75:1 to 1.25:1, or 0.9:1 to 1.1:1) as a solution or slurry or dispersion for addition at any of the mentioned points, preferably after esterification is 90% converted, and then adding a second feed stream of metal A and/or B, such as one containing an alkaline earth metal or alkali metal, such as Na or Li, either before or after the first feed stream addition point that will result the ultimate desired A:B ratio on the polyester polymer, or the desired alkaline earth metal or alkali:Al mole ratio. This method will result in very similar catalyst activity when compared with a lithium-aluminum solution with the ultimate desired mole ratio added at the standard addition point. The invention allows one the flexibility to operate two melt phase lines with two different catalyst mole ratios while having only one catalyst mix/feed system at a fixed metal ratio A:B feeding both lines from the catalyst mix/feed system.

Accordingly, the process of the invention also provides for making a polyester polymer in a melt phase line comprising feeding a fixed targeted amount of catalyst metals A and B from a catalyst mix tank to the melt phase line and producing a polyester polymer having an amount of metal A that is greater than the amount of metal A fed from the catalyst mix tank to the melt phase process, or an amount of metal B that is greater than the amount of metal B fed from the catalyst mix tank to the melt phase process, or an amount of metals A and B that is greater than the amount of metals A and B fed from the catalyst mix tank to the melt phase process, each without varying the fixed target amount of metals A and B fed from a catalyst mix tank to the melt phase line. The melt phase line is desirably a continuous process and has a throughput of at least 50 tons/day at steady state operation.

Embodiments in which the catalyst system employed as the first feed stream comprises Al and an alkaline earth metal or alkali metal or one or more of the metals employed in the second feed stream being an alkaline earth metal or alkali metal are now described.

Aluminum may be added to the catalyst mix tank as a compound (which includes a salt or a complex), or as an elemental metal provided that it is ultimately active as a catalyst in the polycondensation phase either alone or in combination with the alkali metal or alkaline earth metal atoms or compounds.

In one aspect of the invention, aluminum compounds with at least one organic substituent, or two, or three, are used in the preparation of the composition. Illustrative examples of aluminum compounds suitable as catalysts include those of the formula

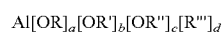

wherein R, R', R" are independently an alkyl group, aryl group, acyl group or hydrogen, R'". is an anionic group, and a, b, c, d are independently 0 or positive integers, and a+b+c+d is not greater than 3, and desirably equal to 3.

Aluminum compounds having catalytic activity, and for that matter any metal having catalytic activity for a polycondensation reaction, include those which are capable of increasing the reaction rate of a polymerization reaction, in particular a condensation reaction such a those used to make polyester polymers (which can be measured as a reduction in residence time to reach a target It.V., or an increase in It.V. over time such as an increase of at least 0.1 dL/g over 1 hour). The particular aluminum compounds chosen are preferably those which are effective to increase the It.V. of the reaction melt by at least 0.2 dL/g within 1 hour.

It is also desirable to use an aluminum compound which has a higher solubility in the solvent. Suitable examples of aluminum compounds include the carboxylic acid salts of aluminum such as aluminum acetate, aluminum benzoate, aluminum lactate, aluminum laurate, aluminum stearate, aluminum alcoholates such as aluminum ethylate, aluminum isopropylate, aluminum tri n-butyrate, aluminum isopropoxide, aluminum tri-tert-butyrate, mono-sec-butoxyaluminum diisopropylate, and aluminum chelates in which the alkoxy group of an aluminum alcoholate is partially or wholly substituted by a chelating agents such as an alkyl acetoacetate or acetylacetone such as ethyl acetoacetate aluminum diisopropylate, aluminum tris(ethyl acetate), alkyl acetoacetate aluminum diisopropylate, aluminum monoacetylacetate bis (ethyl acetoacetate), aluminum tris(acetyl acetate), aluminum acetylacetonate.

Preferred among the aluminum compounds are the basic carboxylic acid salts of aluminum and aluminum alcoholates. Basic carboxylic acid salts of aluminum include monobasic and dibasic compounds. The basic aluminum acetate used can be either the diacetate monohydroxy compound or the monoacetate dihydroxy compound or a mixture thereof. In one aspect, the aluminum compound comprises aluminum acetate and aluminum isoproxide. Aluminum isopropoxide is most preferred.

An amount of aluminum atoms, in combination with M (the alkaline earth metal or alkali metal), are employed to effect polycondensation once added to the melt phase polymerization process. Suitable amounts of aluminum atoms present in the polymer generally range from at least 3 ppm, or at least 5 ppm, or at least 10 ppm, or at least 15 ppm, or at least 20 ppm, or at least 30 ppm, and up to about 150 ppm, or up to about 100 ppm, or up to about 75 ppm, or up to about 60 ppm aluminum atoms based on the weight of the polymer. The preferred range of aluminum loading in the polyester polymer is, and the amount of aluminum atoms present in the composition fed to a melt phase polymerization reactor is effective to provide in the polymer, 5 ppm to 60 ppm, with the most preferred amount on a calculated basis ranging from 10 to 20 ppm Al based on the weight of the polymer.

Of course, the first feed stream composition may and usually will contain a much higher concentration of the metals than present in the polyester polymer. The composition is fed or metered to the melt phase at a rate corresponding to the desired amount of metal present in the polyester polymer. The composition may contain from 1000 ppm, or at least 2000 ppm, or greater than 3000 ppm, or at least 3500 ppm, or at least 4000 ppm, or at least 5000 ppm, or at least 1 wt. %. The maximum amount of aluminum used is up to its solubility limit in a given solvent mix at ambient conditions. High concentrations of aluminum are desirable so that the amount of solvent fed to the melt phase process is reduced and/or higher loadings of aluminum can be fed to the melt phase process for making the polyester polymer at a given flow rate in order to increase the polycondensation reaction rate and thereby lower the polymerization time and increase throughput.

In one embodiment, there is provided a catalyst solution containing at least 3000 ppm aluminum, or at least 3500 ppm aluminum, or at least 4000 ppm aluminum, or at least 10,000 ppm, and may contain up to 10 wt. % or up to 5 wt. % or up to 3 wt. % or up to 2 wt. % aluminum. By a solution is meant a composition which is capable of remaining in solution over a period of at least one (1) week without visible precipitation when left standing still at ambient conditions (within a range of 25° C. to 40° C.).

The alkali may be added as a metal compound or an organometallic compound. The alkali metals and alkaline earth metals include the metals in Group IA and Group IIA or the periodic table, including but not limited to Li, Na, K, Rb, Cs, Mg, Ca, Sr, and preferably Li, Na or K. If rapid rates are the primary concern, Li or Na are generally preferred. If color is the primary concern, Na is most preferred. The metals may be added to the melt phase as metal compounds (which includes a complex or a salt) having counterions, among which the preferred ones are hydroxides, carbonates, and carboxylic acids.

The amount of alkaline earth metal or alkali, in combination with Al, is effective to increase the molecular weight of the polymer melt. The amount by weight will vary widely depending upon the molecular weight of the metal. The amount of the alkaline earth metal or alkali metal in the composition may vary between at least 250 ppm, or at least 500 ppm, or at least 700 ppm, or at least 780 ppm, or at least 1000 ppm, or at least 2000 ppm, or at least 2460 ppm, or at least 3000 ppm, or at least 5000 ppm, or at least 1 wt. %, or at least 2 wt. %, and up to about 30 wt. %, or up to about 20 wt. %, or up to 15 wt. %, or up to 10 wt. %, or up to 5 wt. %, or up to 2 wt. %, or up to 1 wt. %, or up to 5000 ppm, based on the weight of the solution. The amount of alkaline earth metal or alkali metal fed to the melt phase polymerization process is effective to produce a polyester polymer composition containing, and the polyester polymer composition contains, from at least 1 ppm, or at least 2 ppm, or at least 3 ppm, or at least 4 ppm, or at least 5 ppm, and up to about 60 ppm, or up to about 50 ppm, or up to about 30 ppm, or up to about 20 ppm, or up to about 15 ppm, alkaline earth metal or alkali metal on a calculated basis and based on the weight of the polyester polymer composition. The particular amount of the alkaline earth metal or alkali metal in the polyester polymer again will vary depending upon the molecular weight of the metal.

The solution, dispersion, or slurry is prepared by combining the metal compounds, e.g. alkaline earth metal or alkali salts with the aluminum compounds, preferably a tridentate aluminum compound, along with the desired solvent, such as ethylene glycol, DEG, polyhydroxylethers compounds, or mono-ol ether solvents, or combinations thereof, or any other suitable solvent, and stirring the mixture at a temperature ranging from 20° C. to 150° C., or at 80° C. to 140° C.

In the metals tank, the alkaline earth metal or alkali metal can be dissolved in water or any other suitable solvent.

While a catalyst mix tank 103 and a metals tank 104 is described, the process of the invention may include any other device preceding or after these tanks, such as proceeding from a mix tank to a feed vessel, metering devices, valves, and pumps.

A phosphorus compound is also desirably added to a melt phase polymerization process, the catalyst stabilizer is added to the polyester melt late during the course of polycondensation and before solidification. The deactivator is added to the polyester melt late in the course of the polycondensation reaction when one or more of the following conditions are satisfied or thereafter and before solidification of the polyester melt:

a) the polyester melt reaches an It.V. of at least 0.50 dL/g or
b) vacuum applied to the polyester melt, if any, is released, at least partially, or
c) if the polyester melt is present in a melt phase polymerization process, adding the phosphorus compound within a final reactor for making the polyester polymer, near its discharge point, or between the final reactor and before a cutter for cutting the polyester melt, or
d) if the polyester melt is present in a melt phase polymerization process, following at least 85% of the time for polycondensing the polyester melt; or
e) the It.V. of the polyester melt is within +/−0.15 dl/g of the It.V. obtained upon solidification; or
f) at a point within 30 minutes or less, or 20 minutes or less of solidifying the polyester melt.

In one embodiment, the deactivator is added to the polyester melt after the polyester melt obtains an It.V. of at least 0.50 dL/g, or at least 0.55 dL/g, or at least 0.60 dL/g, or at least 0.65 dL/g, or at least 0.68 dL/g, or at least 0.70 dL/g, or at least 0.72 dL/g or at least 0.76 dL/g, or at least 0.78 dL/g, and most preferably, regardless of when the deactivator is added, the resulting polymer exiting the melt phase manufacture has an It.V. of at least 0.68 dL/g or at least 0.72 dL/g or at least 0.76 dL/g.

In another embodiment, the deactivator is added to the polyester melt during or after releasing the vacuum from the polyester melt undergoing polycondensation reactions, or after bringing the pressure in a polycondensation zone or reactor from a lower level of at most 10 mm Hg or less or preferably from a lower level of at most 3 mm Hg or less to a level of 300 mm Hg or greater, or 450 mm Hg or greater, or 600 mm Hg or greater, or to atmospheric pressure or greater, and preferably before the polyester melt is solidified.

In another embodiment, the deactivator is added at a location near or at the end of a final reactor or between the final reactor and before a cutter. For example, the deactivator is added to the last polycondensation reactor at a location proximal to the outlet of the last polycondensation reactor, or to a pipe connecting directly or indirectly the last polycondensation reactor and a gear pump or extruder providing the motive force to drive the melt through a die plate for cutting wherein said pipe is directed back to or proximal to the outlet or the bottom of the last polycondensation reactor, or to a pipe inlet to the last polycondensation reactor that is proximal to its outlet. By proximal to the outlet of the last polycondensation reactor, it is meant that the addition location is within the last 25% or less of said reactor or with within the last 15% or less of said reactor or preferably in the last 10% or less of said reactor. The percentage can be by length or height or volume of the last polycondensation reactor. Preferably the percentage is by length or height. The last percentages of lengths, heights or volumes are measured starting from the last polycondensation reactor's outlet.

In yet another embodiment, the deactivator is added to the polyester melt following at least 85%, or at least 90%, or at least 95%, or at least 98%, or about 100% of the average polycondensation time. The average polycondensation time is measure of the average time elapsed between when a given portion of melt enters the start of polycondensation zone to when that given portion of melt reaches the exit of the polyester melt from the last polycondensation reactor. The average polycondensation time or average residence time in the polycondensation zone can be measured by tracer studies or modeling. In a further embodiment, the deactivator is added to the polyester melt when the It.V. of the polyester melt is within 0.15 dL/g, or within 0.10 dL/g, or within 0.05 dl/g, or within 0.030 dL/g, or within 0.02 of the It.V. obtained upon solidification. For example, the polyester melt could have an It.V. that is 0.10 dL/g below the It.V. obtained upon solidification, or it could have an It.V. that is 0.10 dL/g above the It.V. obtained upon solidification.

In yet another embodiment, the deactivator is added to the polyester melt at a point within 30 minutes or less, within 20 minutes or less, or within 10 minutes or less, or 5 minutes or less, or 3 minutes or less of solidifying the polyester melt. The solidification of the polyester melt typically occurs when the melt is forced through a die plate into a water bath and cut into pellets, or in a melt-to-mold process when the melt is injection molded into a molded article. In the broadest sense, solidification occurs when the temperature of the polymer melt is cooled below the crystalline melting temperature of the polymer.

In yet a more preferred embodiment, each of the embodiments identified herein occurs individually or in combination in a continuous manufacturing process where the throughput of the melt phase process is at least 1 metric ton/day, or at least 50 metric tons/day, or at least 100 metric tons/day, or at least 200 metric tons/day, or at least 300 metric tons/day, or at least 400 metric tons/day, or at least 500 metric tons/day of polyester polymer in a steady state operation.

The reaction time of the melt from an It.V. of 0.40 dL/g through and up to an It.V. in the range of at least 0.68 dL/g to 0.94 dL/g is preferably 240 minutes or less, 210 minutes or less, 180 minutes or less, 150 minutes or less, or 120 minutes or less, or 90 minutes or less, or 50 minutes or less. During the times stated, the vacuum applied is preferably between 0.5 and 1.0 mm Hg, the temperature is preferably between 275° C. to 285° C. The target It.V. is preferably between 0.82 and 0.92 dL/g prior to deactivation/stabilization.

It is to be understood that the melt phase process conditions and reactor configurations described above are illustrative of a melt phase process, and that the invention is not limited to this illustrative process. For example, while reference has been made to a variety of operating conditions at certain discrete It.V. values, differing process conditions may be implemented inside or outside of the stated It.V. values, or the stated operating conditions may be applied at It.V. points in the melt other than as stated. Moreover, one may adjust the process conditions based on reaction time instead of measuring or predicting the It.V. of the melt. The process is also not limited to the use of tank reactors in series or parallel or to the use of different vessels for each zone. Nor is it necessary to split the polycondensation reaction into a prepolymer zone and a finishing zone because the polycondensation reaction can take place in one polycondensation reactor with variations in operating conditions over time or in a multitude of reactors in series, either in a batch, semi-batch, or a continuous process.

Once the desired It.V. is obtained, the molten polyester polymer in the melt phase reactors is discharged as a melt phase product, cut, and solidified. The melt phase polyester polymer product is processed to a desired form, such as amorphous particles; however, crystallized pellets are preferred. The shape of the polyester polymer particles is not limited, and can include regular or irregular shaped discrete particles without limitation on their dimensions, including stars, spheres, spheroids, globoids, cylindrically shaped pellets, conventional pellets, pastilles, and any other shape, but particles are distinguished from a sheet, film, preforms, strands or fibers.

The number average weight (not to be confused with the number average molecular weight) of the particles is not particularly limited. Desirably, the particles have a number average weight of at least 0.10 g per 100 particles, more preferably greater than 1.0 g per 100 particles, and up to about 100 g per 100 particles.

The method for solidifying the polyester polymer from the melt phase process is not limited. For example, molten polyester polymer from the melt phase process may be directed through a die, or merely cut, or both directed through a die followed by cutting the molten polymer. A gear pump may be used as the motive force to drive the molten polyester polymer through the die. Instead of using a gear pump, the molten polyester polymer may be fed into a single or twin screw extruder and extruded through a die, optionally at a temperature of 190° C. or more at the extruder nozzle. Once through the die, the polyester polymer can be drawn into strands, contacted with a cool fluid, and cut into pellets, or the polymer can be pelletized at the die head, optionally underwater. The polyester polymer melt is optionally filtered to remove particulates over a designated size before being cut. Any conventional hot pelletization or dicing method and apparatus can be used, including but not limited to dicing, strand pelletizing and strand (forced conveyance) pelletizing, pastillators, water ring pelletizers, hot face pelletizers, underwater pelletizers and centrifuged pelletizers.

The polyester polymer is one which is crystallizable. The method and apparatus used to crystallize the polyester polymer is not limited, and includes thermal crystallization in a gas or liquid. The crystallization may occur in a mechanically agitated vessel; a fluidized bed; a bed agitated by fluid movement; an un-agitated vessel or pipe; crystallized in a liquid medium above the $T_g$ of the polyester polymer, preferably at 140° C. to 190° C.; or any other means known in the art. Also, the polymer may be strain crystallized.

The polymer may also be fed to a crystallizer at a polymer temperature below its $T_g$ (from the glass), or it may be fed to a crystallizer at a polymer temperature above its $T_g$. For example, molten polymer from the melt phase polymerization reactor may be fed through a die plate and cut underwater, and then immediately fed to an underwater thermal crystallization reactor where the polymer is crystallized underwater. Alternatively, the molten polymer may be cut, allowed to cool to below its $T_g$, and then fed to an underwater thermal crystallization apparatus or any other suitable crystallization apparatus. Or, the molten polymer may be cut in any conventional manner, allowed to cool to below its $T_g$, optionally stored, and then crystallized.

The degree of crystallinity is optionally at least 30%, or at least 35%, or at least 40%.

Suitable polyesters are those having repeating alkyelene arylate units, such as polyalkylene terephthalate or naphthalate. In one embodiment, the polyester polymer comprises:

(a) a carboxylic acid component comprising at least 90 mole %, or at least 92 mole %, or at least 96 mole % of the residues of terephthalic acid, derivates of terephthalic acid, naphthalene-2,6-dicarboxylic acid, derivatives of naphthalene-2,6-dicarboxylic acid, or mixtures thereof, more preferably terephthalic acid or derivates of terephthalic acid, and (b) a hydroxyl component comprising at least 90 mole %, or at least 92 mole %, or at least 96 mole % of the residues of ethylene glycol or propane diol, more preferably ethylene glycol, based on 100 mole percent of the carboxylic acid component residues and 100 mole percent of the hydroxyl component residues in the polyester polymer.

The reaction of the carboxylic acid component with the hydroxyl component during the preparation of the polyester polymer is not restricted to the stated mole percentages since one may utilize a large excess of the hydroxyl component if desired, e.g. on the order of up to 200 mole % relative to the 100 mole % of carboxylic acid component used. The polyester polymer made by the reaction will, however, contain the stated amounts of aromatic dicarboxylic acid residues and ethylene glycol residues.

Derivates of terephthalic acid and naphthalane dicarboxylic acid include $C_1$-$C_4$ dialkylterephthalates and $C_1$-$C_4$ dialkylnaphthalates, such as dimethylterephthalate and dimethylnaphthalate.

Modifiers can be present in amount of up to 40 mole %, or up to 20 mole %, or up to 10 mole %, or up to 8 mole %, or up to 4 mole %, based on the total moles of their respective component in the polymer. Mono, tri and higher functional modifiers are preferably present in amounts of only up to about 8 mole %, or up to 4 mole %.

In addition to a diacid component of terephthalic acid, derivates of terephthalic acid, naphthalene-2,6-dicarboxylic acid, derivatives of naphthalene-2,6-dicarboxylic acid, or mixtures thereof, the carboxylic acid component(s) of the present polyester may include one or more additional modifier carboxylic acid compounds. Such additional modifier carboxylic acid compounds include mono-carboxylic acid compounds, dicarboxylic acid compounds, and compounds with a higher number of carboxylic acid groups. Examples include aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. More specific examples of modifier dicarboxylic acids useful as an acid component(s) are phthalic acid, isophthalic acid, naphthalene-2,6-dicarboxylic acid, cyclohexane-1,4-dicarboxylic acid, cyclohexanediacetic acid, diphenyl-4,4'-dicarboxylic acid, succinic acid, glutaric acid, adipic acid, azelaic acid, sebacic acid, and the like, with isophthalic acid, naphthalene-2,6-dicarboxylic acid, and cyclohexane-1,4-dicarboxylic acid being most preferable. It should be understood that use of the corresponding acid anhydrides, esters, and acid chlorides of these acids is included in the term "carboxylic acid". It is also possible for tricarboxyl compound branching agents and compounds with a higher number of carboxylic acid groups to modify the polyester, along with monocarboxylic acid chain terminators.

In addition to a hydroxyl component comprising ethylene glycol, the hydroxyl component of the present polyester may include additional modifier polyhydroxyls, diols, or compounds with a higher number of hydroxyl groups. Examples of modifier hydroxyl compounds include cycloaliphatic diols preferably having 6 to 20 carbon atoms and/or aliphatic diols preferably having 3 to 20 carbon atoms. More specific examples of such diols include diethylene glycol; triethylene glycol; 1,4-cyclohexanedimethanol; propane-1,3-diol; butane-1,4-diol; pentane-1,5-diol; hexane-1,6-diol; 3-methylpentanediol-(2,4); 2-methylpentanediol-(1,4); 2,2,4-trimethylpentane-diol-(1,3); 2,5-ethylhexanediol-(1,3); 2,2-diethyl propane-diol-(1,3); hexanediol-(1,3); 1,4-di-(hydroxyethoxy)-benzene; 2,2-bis-(4-hydroxycyclohexyl)-propane; 2,4-dihydroxy-1,1,3,3-tetramethyl-cyclobutane; 2,2-bis-(3-hydroxyethoxyphenyl)-propane; and 2,2-bis-(4-hydroxypropoxyphenyl)-propane.

As modifiers, the polyester polymer may preferably contain such comonomers as isophthalic acid, naphthalane dicarboxylic acid, 1,4-cyclohexanedimethanol, and diethylene glycol.

The polyester composition may include blends of polyalkylene terephthalates and/or polyalkylene naphthalates along with other thermoplastic polymers such as polycarbonate (PC) and polyamides. It is preferred that the polyester composition should comprise a majority of the polyester polymers, more preferably in an amount of at least 80 wt. %, or at least 95 wt. %, and most preferably 100 wt. %, based on the weight of all thermoplastic polymers (excluding fillers, inorganic compounds or particles, fibers, impact modifiers, or other polymers which may form a discontinuous phase). It is also preferred that the polyester polymers do not contain any fillers, fibers, or impact modifiers or other polymers which form a discontinuous phase.

In one embodiment, the composition contains less than 60 wt %, or less than 40 wt %, or less than 20 wt. %, or less than 10 wt. %, or less than 5 wt. %, or no post consumer recycle polyester polymer ("PCR") present in the composition.

In another embodiment, the composition contains PCR in an amount of greater than zero and up to 60 wt. %, or up to 40 wt. %, or up to 20 wt %, or up to 10 wt. %.

The particles of the invention are directly or indirectly packaged as a bulk into shipping containers, which are then shipped to customers or distributors. It is preferred to subject the crystallized particles to any process embodiment described herein without solid state polymerizing the particles at any point prior to packaging the particles into shipping containers. With the exception of solid state polymerization, the particles may be subjected to numerous additional processing steps in-between any of the expressed steps.

Shipping containers are containers used for shipping over land, sea or by air. Examples include railcars, semi-tractor trailer containers, Gaylord boxes, ship hulls, or any other container which is used to transport finished polyester particles to a customer. Customers are typically converter entities who convert the particles into preforms or other molded articles.

The shipping containers contain a bulk of polyester polymer particles. A bulk occupies a volume of at least 3 cubic meters. In preferred embodiments, the bulk in the shipping container occupies a volume of at least 5 cubic meters, or at least 10 cubic meters.

In one embodiment, there is provided finished polyester polymer particles having an average It.V. of at least 0.68 dL/g, or 0.70 dL/g, or 0.72 dL/g, or 0.74 dL/g, or 0.76 dL/g, or 0.80 dL/g, obtained in a melt phase polymerization and a residual acetaldehyde level of 10 ppm or less, or of 5 ppm or less; wherein said particles comprising an aluminum level in an amount of at least 3 ppm, or at least 5 ppm, or at least 10 ppm, or at least 15 ppm, or at least 20 ppm, based on the weight of the polymers. Preferably, the polyester particles in the shipping container also have a degree of crystallinity of at least 20%, preferably at least 30%; and the particles also contain a nonzero level of an alkaline earth metal or alkali metal, along with a nonzero level of phosphorus.

More preferably, the AA generation rate of such particles is less than 20 ppm, or less than 18 ppm, or less than 16 ppm, or less than 14 ppm, or less than 12 ppm, or less than 10 ppm, and the particles have an L* brightness of at least 55, or at least 60, or at least 65, at least 70, or at least 73, or at least 76, and lack AA scavengers. The particles are desirably contained in a shipping container. Most preferably, the particles have not been solid state polymerized. By "finished" particles, it is meant particles that have been subjected by the particle manufacturer to all the processing conditions needed to produce a particle ready for feeding into dryer hoppers associated with a molding machine or directly to a molding machine used for converting particles into articles, without any further processing steps performed by the particle manufacturer.

Articles can be formed from the melt phase products by any conventional techniques known to those of skill. For example, melt phase products, optionally solid state polymerized, which are crystallized to a degree of crystallization of at least 20%, are fed to a machine for melt extruding and injection molding the melt into shapes such as preforms suitable for stretch blow molding into beverage or food containers, or a machine for injection molding, or a machine for merely extruding into other forms such as sheet. Suitable processes for forming the articles are known and include extrusion, extrusion blow molding, melt casting, injection molding, a melt to mold process, stretch blow molding (SBM), thermoforming, and the like.

Examples of the kinds of shaped articles which can be formed from the melt phase products and the polyester polymer composition of the invention include sheet; film; packaging and containers such as preforms, bottles, jars, and trays; rods; tubes; lids; and filaments and fibers. Beverage bottles made from polyethylene terephthalate suitable for holding water or carbonated beverages, and heat-set beverage bottles suitable for holding beverages which are hot filled into the bottles are examples of the types of bottles which are made from the crystallized pellet of the invention. Examples of trays are those which are dual ovenable and other CPET trays.

Each of the embodiments identified herein may, if desired, occur in a continuous manufacturing process where the throughput of the melt phase process is at least 1 ton/day, or at least 50 tons/day, or at least 100 tons/day, or at least 200 tons/day, or at least 300 tons/day, or at least 400 tons/day, or at least 500 tons/day of polyester polymer in a steady state operation.

The reaction time of the melt from an It.V. of 0.40 dL/g through and up to an It.V. in the range of at least 0.68 dL/g to 0.94 dL/g is 150 minutes or less, or 120 minutes or less, or 90 minutes or less, or 50 minutes or less. The target It.V. is preferably between 0.84 and 0.94 dL/g prior to deactivation/stabilization, the vacuum applied is preferably between 0.5 and 1.0 torr, and temperature is preferably between 275° C. to 285° C.

This invention can be further illustrated by the additional examples of embodiments thereof, although it will be understood that these examples are included merely for purposes of illustration and are not intended to limit the scope of the invention.

EXAMPLES

Oligomer source: Oligomers were made using a Parr reactor. Some included LiOH.H$_2$O or Al(O$^i$Pr)$_3$ (see Table 1 below).

Lithium-aluminum solution preparation: LiOH.H$_2$O and Al(O$^i$Pr)$_3$ were used as sources of the catalyst metals. Solutions were prepared by combining the appropriate amount of each catalyst compound in ethylene glycol to reach the desired Li:Al mole ratio and a total aluminum concentration of 3000 ppm by weight. The solutions were heated to 125° C. with a nitrogen purge to remove any low boiling volatiles. The 1:1 Li:Al solution precipitated over time and was added to the polymerization as a slurry.

Polymerization procedure: The standard half-mole rig set up was used for each polymerization. Each 500 mL round bottom flask was charged with 113 grams of oligomer and the Camile sequence below was started. Catalyst solution was added at stage 3 and excess LiOH.H₂O in EG (when indicated) was added either 10 or 20 minutes after the initial addition of catalyst. The target Al loading was 15 ppm in all cases. In cases where no additional lithium was added, ethylene glycol was added 20 minutes after the catalyst solution to keep the overall EG load on the system consistent. All runs were torque terminated at a true torque value of 6.0. Finisher time is reported as the primary indication of catalyst activity.

Parr Charges and Sequence:
TPA: 1628 g
IPA: 33 g
EG: 869 g
LiOH.H$_2$O: 0.2 g (19 ppm) when necessary
Al(O$^i$Pr)$_3$: 0.2 g (15 ppm) when necessary

| Stage | time (min) | RPM | psig (torr) | Temp-vessel (° C.) | Temp-column (° C.) |
|---|---|---|---|---|---|
| 1 | 0.1 | 0 | 0 | 25 | 25 |
| 2 | 5 | 180 | 40 | 25 | 25 |
| 3 | 0.1 | 180 | 40 | 240 | 25 |
| 4 | 45 | 180 | 40 | 240 | 25 |
| 5 | 0.1 | 180 | 40 | 240 | 150 |
| 6 | 15 | 180 | 40 | 240 | 150 |
| 7 | 180 | 180 | 40 | 240 | 150 |
| 8 | 30 | 180 | 0 | 240 | 150 |

Camile Sequence:

| Stage | Time (min) | Temp (° C.) | Vacuum (torr) | Stir (rpm) | Flags |
|---|---|---|---|---|---|
| 1 | 0.1 | 265 | 730 | 0 | |
| 2 | 10 | 265 | 730 | 150 | |
| 3 | 1 | 265 | 730 | 150 | Add Li/Al solution |
| 4 | 2 | 265 | 330 | 300 | |
| 5 | 2 | 265 | 330 | 300 | Calibrate stirrer |
| 6 | 6 | 278 | 30 | 300 | |
| 7 | 44 | 278 | 30 | 300 | |
| 8 | 2 | 278 | 30 | 300 | |
| 9 | 1 | 278 | 30 | 200 | |
| 10 | 20 | 278 | 30 | 200 | |
| 11 | 2 | 278 | 4 | 200 | |
| 12 | 60 | 278 | 4 | 200 | |
| 13 | 2 | 278 | 0.8 | 30 | |
| 14 | 500 | 278 | 0.8 | 30 | Torque terminated |

The results are reported in Table 1.

TABLE 1

| Sample | Li/Al solution mole ratio | Li equivalents added separately | Li addition point | Ultimate target Li/Al mole ratio | Finisher time (min) | IhV | DEG (weight %) | Li (ppm) | Al (ppm) |
|---|---|---|---|---|---|---|---|---|---|
| 1 | 1:1 | 4 | Post Li/Al | 5:1 | 142.6 | 0.888 | 4.24 | 23 | 18 |
| 2 | 1:1 | 4 | Post Li/Al | 5:1 | 87.5 | 0.832 | 4.36 | 19 | 25 |
| 3 | 1:1 | 4 | Post Li/Al | 5:1 | 99.3 | 0.853 | 4.37 | 30 | 15 |
| 4 | 1:1 | 4 | Post Li/Al | 5:1 | 124.4 | 0.834 | 4.19 | 25 | 13 |
| 5 | 1:1 | 4 | Post Li/Al | 5:1 | 84.4 | 0.885 | 4.42* | 24 | 18 |
| 6 | 5:1 | 0 | N/A | 5:1 | 80.7 | 0.871 | 4.34 | 18 | 16 |
| 7 | 5:1 | 0 | N/A | 5:1 | 124.3 | 0.862 | 4.77 | 20 | 17 |
| 8 | 5:1 | 0 | N/A | 5:1 | 105.1 | 0.861 | 4.42 | 12 | 15 |
| 9 | 5:1 | 0 | N/A | 5:1 | 128.8 | 0.876 | 4.35 | 19 | 16 |
| 10 | 1:1 | 4 | Esterification | 5:1 | 129.8 | 0.906 | 1.64 | 18 | 16 |
| 11 | 1:1 | 4 | Esterification | 5:1 | 107.3 | 0.876 | 1.65 | 18 | 19 |
| 12 | 1:1 | 4 | Esterification | 5:1 | 66.0 | 0.804 | 1.76 | 17 | 15 |
| 13 | 1:1 | 4 | Esterification | 5:1 | 73.3 | 0.814 | 1.80 | 14 | 16 |
| 14[a] | 5:1 | 0 | N/A | 5:1 | 333.4 | 0.767 | 1.06 | 40 | 10 |
| 15[a] | 5:1 | 0 | N/A | 5:1 | 249.2 | 0.793 | 1.45 | 19 | 13 |
| 16[a] | 5:1 | 0 | N/A | 5:1 | 241.0 | 0.728 | 1.49 | 18 | 13 |
| 17 | Al-only | 4 | Esterification | 4:1 | 237.4 | 0.858 | 1.60 | 14 | 13* |
| 18 | 1:1 | 0 | N/A | 1:1 | 126.3 | 0.854 | 4.61 | 4 | 18* |
| 19 | 1:1 | 0 | N/A | 1:1 | 154.2 | 0.903 | 4.13 | 4 | 16 |
| 20 | 1:1 | 0 | N/A | 1:1 | 149.4 | 0.889 | 4.25 | 4 | 17 |

[a] For runs 14-16, the Li and Al were added to the Parr reactor during the esterification process. Runs were manually terminated before target torque was reached
Li addition point definitions: "Post Li/Al": Li solution added 10-20 minutes after Li/Al catalyst solution
"Esterification": Li added during the esterification process in the Parr.
Li equivalents are relative to molar amount of Al added
*resubmitted for analysis and corrected Table 2 sets forth the averages for the runs above.

TABLE 2

| Description | Number of runs | Finisher time (min) | IhV | DEG (wt %) | Li (ppm) | Al (ppm) |
|---|---|---|---|---|---|---|
| 1:1 Li/Al + 4 Li later | 5 | 107.6 | 0.854 | 4.32* | 24.2 | 19.8 |
| 5:1 Li/Al | 4 | 109.7 | 0.868 | 4.47 | 17.3 | 16.0 |
| 1:1 Li/Al + 4 Li during esterification | 4 | 94.1 | 0.850 | 1.71 | 16.8 | 16.5 |
| 5:1 Li/Al added at esterification | 3 | 274.5 | 0.763 | 1.33 | 25.7 | 12.0 |
| 4 Li during esterificatoin, Al only at normal time | 1 | 237.4 | 0.858 | 1.60 | 14.0 | 55.0 |
| 1:1 Li/Al | 3 | 143.3 | 0.882 | 4.33 | 4.0 | 19.3 |

*resubmitted for analysis and corrected

The results of the data indicate that the first three systems have similar activity. A 5:1 Li:Al can be obtained in a number of ways and have similar behavior. As noted above, in one of the embodiments, it is possible to lower DEG by the process of the invention. As noted above, DEG is significantly lower with 4 Li added during esterification. In a batch process, the DEG content starts large so the effect is on DEG reduction is quite large. On a continuous line, it is expected that the DEG content will be reduced as well, but the effect is likely not to be as large since the control DEG content is typically in the range of 2-3 mole percent.

A 1:1 Li/Al control is clearly slower than any of the 5:1 Li/Al runs. Separating Li and Al completely ($5^{th}$ entry in this table, entry 17 above) leads to very poor catalytic activity. Adding a 5:1 Li/Al at the esterification stage is not effective.

What I claim is:

1. A process for feeding metals to one or more melt phase process lines for the production of polyester polymers comprising:
   A. providing a first feed stream, said first feed stream having a first molar ratio and comprising a mixture of metal A and a different metal B;
   B. providing a second feed stream, said second feed stream comprising some kinds of metals as in the first feed stream but not all, or all of the same kind of metals in said first feed stream but at a second molar ratio different than said first molar ratio; and
   C. feeding said first stream to one or more melt phase process lines at an addition point on each line and feeding said second feed stream either:
      (i) into one or more of the melt phase process lines upstream or downstream of the addition point of the first feed stream into the melt phase lines or
      (ii) to the first feed stream leading to the one or more melt phase process lines, combining said first and second feed streams to provide a combined feed stream, and feeding the combined feed stream into one or more of the melt phase process lines.

2. The process of claim 1, wherein the first feed stream comprises metals which, together or alone, increase the reaction rate or promote esterification reaction rates to make, or ester exchange rates to make, or polycondensation rates to make the polyester polymers in the melt phase.

3. The process of claim 1, wherein the first feed stream comprises titanium, tin, antimony, manganese, cobalt, germanium, zinc, aluminum, alkaline earth metal, or alkali metals, or combinations thereof.

4. The process of claim 1, wherein the process is a continuous melt phase process.

5. The process of claim 1, wherein the first feed stream is fed at an addition point on a melt phase process line, the addition point comprising the initiation of a polycondensation, to a pipe connecting an esterification zone with a polycondensation zone, or at the end of the esterification zone.

6. The process of claim 1, wherein the first feed stream contains metals A and B, and the second feed stream contains metals A or B, but not both.

7. The process of claim 1, wherein metal A comprises titanium, antimony, germanium, zinc, aluminum, alkaline earth metal, or an alkali metal, and metal B comprises titanium, antimony, germanium, zinc, aluminum, alkaline earth metal, or an alkali metal.

8. The process of claim 1, wherein the first feed stream contains metals A and B, the second feed stream contains neither metals A nor B.

9. The process of claim 1, wherein the first feed stream contains metals A and B at a first molar ratio, and the second feed stream contain metals A and B at a molar ratio different from the first molar ratio.

10. The process of claim 1, wherein the second feed stream is fed to the melt phase process at an addition point upstream or downstream of the addition point of the first feed stream into the melt phase process.

11. The process of claim 10, wherein the addition point of the second feed stream is upstream of the addition point of the first feed stream.

12. The process of claim 10, wherein the addition point of the second feed stream is downstream of the addition point of the first feed stream.

13. The process of claim 12, wherein the addition point of the second feed stream is to a polycondensation zone.

14. The process of claim 13, wherein the addition point of the second feed stream is at a point before the It.V. of a polymer melt in the polycondensation zone reaches 0.3 dL/g.

15. The process of claim 13, wherein the addition point of the second feed stream is within 20 minutes after the first feed stream is added.

16. The process of claim 10, wherein the addition point of the second feed stream is to a conduit connecting an esterification zone and a polycondensation zone.

17. The process of claim 16, wherein the addition point of the second feed stream is within 10 meters of the addition point of the first feed stream.

18. The process of claim 1, wherein the first and second feed streams are combined to provide a combined feed stream, and the combined feed stream is fed into one or more of the melt phase process lines.

19. The process of claim 1, comprising multiple melt phase production lines, and one catalyst mix tank feeding a first feed stream to at least two melt phase production lines.

20. The process of claim 19, comprising a metals tank feeding a second feed stream to at least one of said melt phase production lines.

21. The process of claim 20, wherein the metals tank feeds a second feed stream to at least two of said melt phase production lines.

22. The process of claim 20, wherein at least a portion of the second feed stream is combined with said first feed stream to provide a combined feed to at least one of said melt phase production lines.

23. The process of claim 1, wherein the molar ratio of metals A and B in the first feed stream to the melt phase process is fixed for at least 5 days of production run time on a melt phase line.

24. The process of claim 1, wherein the second feed stream is added to an esterification zone before 50% conversion of an esterification reaction mixture in the esterification zone.

25. The process of claim 1, wherein the second feed stream is added to a paste tank or to a feed of paste to an esterification reactor.

26. The process of claim 1, wherein the second feed stream comprises and alkali metal.

27. The process of claim 26, wherein the second feed stream comprises lithium fed to at any point in the melt phase process prior to 50% conversion of an esterification reaction mixture in an esterification reactor.

28. The process of claim 1, wherein metal A comprises lithium and metal B comprises aluminum, and the second feed stream comprises lithium, wherein the molar ratio of A:B in a first feed stream ranges from 0.5:1 to 3:1.

29. The process of claim 1, wherein the second feed stream raises the molar ratio of Li:Al in the polyester polymer by at least 25% over the molar ratio of Li:Al in the first feed stream.

30. The process of claim 1, wherein the second feed stream raises the molar ratio of Li:Al in the polyester polymer by at least 100% over the molar ratio of Li:Al in the first feed stream.

31. The process of claim 1, wherein the first feed stream is added to an oligomer mixture upon completion of esterification, or after the oligomer mixture exits the last esterification reactor, and no later than when a polyester melt in a polycondensation zone obtains an It.V. of 0.3 dL/g.

32. The process of claim 1, wherein the polyester polymer contains at least 3 ppm of metal A and at least 5 ppm of metal B.

33. The process of claim 1, wherein metal A comprises aluminum in an amount sufficient to increase the It.V. of the polyester melt by at least 0.1 dL/g over 1 hour.

34. The process of any one of claim 1-33, wherein the polyester comprises:
(a) a carboxylic acid component comprising at least 90 mole % residues of terephthalic acid or derivates of terephthalic acid, and
(b) a hydroxyl component comprising at least 90 mole % residues of ethylene glycol or propane diol, based on 100 mole percent of the carboxylic acid component residues and 100 mole percent of the hydroxyl component residues in the polyester polymer.

35. The process of claim 1, wherein the throughput of at least one of said melt phase process lines is at least 50 tons/day in steady state operation.

36. A process for making polyester polymers comprising making a polyester polymer 1 from a melt phase production line 1, said polyester polymer 1 comprising a metal A and a metal B in a first metal molar ratio of A:B, and a polyester polymer 2 from a melt phase production line 2 comprising a metal A and a metal B at a second metal molar ratio A:B, wherein metal A is different from metal B, the metal molar ratios of polyester polymer 1 and 2 are different from each other, and each of melt phase production lines 1 and 2 are fed from a common catalyst mix tank supplying metals A and B.

37. The process of claim 36, wherein metal A comprises titanium, manganese, cobalt, aluminum, an alkaline earth metal, or an alkali metal, and metal B comprises titanium, manganese, cobalt, aluminum, an alkaline earth metal, or an alkali metal.

38. The process of claim 37, wherein polyester polymer 1 and 2 each contain at least 3 ppm of metal A and at least 5 ppm of metal B.

* * * * *